US012282227B2

(12) United States Patent
Chen et al.

(10) Patent No.: US 12,282,227 B2
(45) Date of Patent: *Apr. 22, 2025

(54) ELECTRODE STRUCTURE, DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yifu Chen, Beijing (CN); Yingying Qu, Beijing (CN); Ting Dong, Beijing (CN); Jianhua Huang, Beijing (CN); Lingdan Bo, Beijing (CN); Feng Qu, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/396,474

(22) Filed: Dec. 26, 2023

(65) Prior Publication Data

US 2024/0126122 A1 Apr. 18, 2024

Related U.S. Application Data

(63) Continuation of application No. 17/425,397, filed as application No. PCT/CN2020/125534 on Oct. 30, 2020.

(51) Int. Cl.
G02F 1/1337 (2006.01)
G02F 1/1343 (2006.01)
(Continued)

(52) U.S. Cl.
CPC .. *G02F 1/133707* (2013.01); *G02F 1/134345* (2021.01); *G02F 1/136286* (2013.01);
(Continued)

(58) Field of Classification Search
None
See application file for complete search history.

(56) References Cited

U.S. PATENT DOCUMENTS 6,611,310 B2 8/2003 Kurahashi et al.
6,646,707 B2 * 11/2003 Noh ................. G02F 1/134363
349/143

(Continued)

FOREIGN PATENT DOCUMENTS

CN 1374546 A 10/2002
CN 101344687 A 1/2009
(Continued)

OTHER PUBLICATIONS

English translation of Written Opinion from PCT/CN2020/125534 dated May 26, 2021 (6 pages).
(Continued)

*Primary Examiner* — Dung T Nguyen
(74) *Attorney, Agent, or Firm* — Calfee, Halter & Griswold LLP

(57) ABSTRACT

The present disclosure relates to an array substrate. At least one of a pixel electrode and a common electrode in the array substrate has an electrode structure. The electrode structure includes: first and second electrode portions, and a conductive connection portion. The first electrode portion includes a first connection bar and first electrode bars. The second electrode portion includes a second connection bar and second electrode bars. No common line is provided in each of the sub-pixel regions.

16 Claims, 9 Drawing Sheets

(51) Int. Cl.
  *G02F 1/1362* (2006.01)
  *G02F 1/1339* (2006.01)
  *G02F 1/1368* (2006.01)

(52) U.S. Cl.
  CPC .... *G02F 1/13394* (2013.01); *G02F 1/134309* (2013.01); *G02F 1/1368* (2013.01)

(56) References Cited

U.S. PATENT DOCUMENTS

| | | | |
|---|---|---|---|
| 7,253,863 B2 | 8/2007 | Ono et al. | |
| 7,714,969 B2 | 5/2010 | Asakura et al. | |
| 8,259,269 B2 | 9/2012 | Itou et al. | |
| 8,773,341 B2 * | 7/2014 | Takano | G02F 1/136227 349/139 |
| 9,442,333 B2 | 9/2016 | Um et al. | |
| 11,921,378 B2 * | 3/2024 | Chen | G02F 1/136286 |
| 2002/0126241 A1 | 9/2002 | Kurahashi et al. | |
| 2007/0024789 A1 | 2/2007 | Itou et al. | |
| 2009/0015774 A1 | 1/2009 | Asakura et al. | |
| 2015/0108486 A1 | 4/2015 | Um et al. | |
| 2015/0234242 A1 | 8/2015 | Inoue | |
| 2017/0031490 A1 | 2/2017 | Hashida | |

FOREIGN PATENT DOCUMENTS

| | | |
|---|---|---|
| CN | 103364987 A | 10/2013 |
| CN | 103488002 A | 1/2014 |
| CN | 104425560 A | 3/2015 |
| CN | 104516162 A | 4/2015 |
| CN | 106526937 A | 3/2017 |
| CN | 106684101 A | 5/2017 |
| CN | 109581761 A | 4/2019 |
| CN | 110010059 A | 7/2019 |
| CN | 110764329 A | 2/2020 |
| CN | 111338144 A | 6/2020 |
| JP | 11352512 A | 12/1999 |
| JP | 2010145862 A | 7/2010 |
| KR | 1020080071231 A | 8/2008 |

OTHER PUBLICATIONS

English translation of International Search Report from PCT/CN2020/125534 dated May 26, 2021 (3 pages).
Notice of Allowance from U.S. Appl. No. 17/425,397, filed Oct. 13, 2023.
Notice of Allowance from Chinese Application No. 202080002577.X dated May 31, 2023 (10 pages).
Office Action from U.S. Appl. No. 17/425,397, filed Mar. 16, 2023.
Office action from Indian Application No. 202227040584 dated Jan. 1, 2024.

* cited by examiner

ELECTRODE STRUCTURE, DISPLAY PANEL AND DISPLAY DEVICE

CROSS-REFERENCE TO RELATED APPLICATIONS

This application is a continuation application of U.S. application Ser. No. 17/425,39, which is a national phase application under 35 U.S.C. § 371 of International Application No. PCT/CN2020/125534, filed Oct. 30, 2020, the contents of which are incorporated by reference in their entirety herein.

TECHNICAL FIELD

The present disclosure relates to display technologies and in particular, to an electrode structure, a display panel and a display device.

BACKGROUND

With the continuous developments of liquid crystal panels, high-resolution products are constantly being developed. At present, in order to improve the light efficiency and transmittance of pixels, the Indium Tin Oxide (ITO) electrode structure on array substrates is made increasingly small and thin. Thus, the ITO electrode is likely to be affected by impurity particles during the manufacturing process, which can easily lead to undesirable conditions such as disconnection, resulting in pixel failure and lowering the product yield.

It should be noted that the information in the background section above is only used to enhance the understanding of the background of the present disclosure, and therefore may include information that does not constitute the prior art known to those of ordinary skill in the art.

SUMMARY

An objective of the present disclosure is to provide an electrode structure, a display panel and a display device, which can improve the light efficiency and transmittance of pixels, and can also reduce the disconnection defects in the manufacturing process and increase the production yield.

According to a first aspect of the present disclosure, there is provided an electrode structure, including:
  a first electrode portion including a first connection bar extending in a first direction and a plurality of first electrode bars arranged at intervals in the first direction, wherein the first connection bar has a first side and a second side which are opposite in a second direction, the plurality of first electrode bars are located on the first side of the first connection bar and connected to the first connection bar, and ends of adjacent first electrode bars away from the first connection bar are in an open shape;
  a second electrode portion spaced apart from the first electrode portion in the first direction, wherein the second electrode portion includes a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are located on the third side of the second connection bar and connected to the second connection bar, and ends of adjacent second electrode bars away from the second connection bar are in an open shape; and
  a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars;
  wherein the first direction and the second direction are perpendicular to each other.

According to an exemplary embodiment of the present disclosure, orthographic projections of the first electrode portion and the second electrode portion and an orthographic projection of the conductive connection portion on a reference plane overlap with each other, and the reference plane is a plane perpendicular to the first direction.

According to an exemplary embodiment of the present disclosure, extending directions of the first electrode bars, the second electrode bars and the conductive connection portion are all parallel to a third direction, a first width of each of the electrode bars is equal to a first width of each of the second electrode bars, and the first width of each of the first electrode bars is smaller than a first width of the conductive connection portion;
  wherein the first width is a size in a fourth direction, the third direction is perpendicular to the fourth direction, and the third direction intersects both the first direction and the second direction.

According to an exemplary embodiment of the present disclosure, the conductive connection portion includes:
  a first conductive connection bar and a second conductive connection bar that are arranged at intervals in the second direction and both extend in the first direction; and
  at least two third conductive connection bars located between the first conductive connection bar and the second conductive connection bar and arranged at intervals in the first direction, wherein two ends of each of the third conductive connection bars are connected to the first conductive connection bar and the second conductive connection bar, respectively, and extending directions of the third conductive connection bars are parallel to the third direction;
  wherein the first conductive connection bar is connected to the first connection bar, and the second conductive connection bar is connected to the second connection bar.

According to an exemplary embodiment of the present disclosure, a first width of each of the third conductive connection bars is equal to the first width of each of the first electrode bars;
  a second width of the first conductive connection bar is equal to a second width of the first connection bar;
  a second width of the second conductive connection bar is equal to a second width of the second connection bar;
  the second width is a size in the second direction.

According to an exemplary embodiment of the present disclosure, a slit between adjacent first electrode bars is a first slit;
  a slit between adjacent second electrode bars is a second slit;
  a slit between adjacent third conductive connection bars is a third slit;

a slit between the third conductive connection bars and the first electrode bars is a fourth slit;

a slit between the third conductive connection bars and the second electrode bars is a fifth slit;

a first width of the first slit, a first width of the second slit, a first width of the third slit, a first width of the fourth slit and a first width of the fifth slit are all equal.

According to an exemplary embodiment of the present disclosure, a ratio of the first width of the first slit to the first width of each of the first electrode bars is 1 to 4.

According to an exemplary embodiment of the present disclosure, a length of the first conductive connection bar and a length of the second conductive connection bar are both smaller than a length of the first connection bar and smaller than a length of the second connection bar, and the length is a size in the first direction.

According to an exemplary embodiment of the present disclosure, the conductive connection portion is a conductive connection bar, the conductive connection bar extends in the third direction, and a ratio of a first width of the conductive connection bar to the first width of each of the first electrode bars is 1.5 to 5.5.

According to an exemplary embodiment of the present disclosure, the first electrode portion further includes a signal connection bar which is located on the first side of the first connection bar and connected to the first connection bar and is located on a side of the plurality of first electrode bars away from the conductive connection portion.

According to a second aspect of the present disclosure, there is provided a display panel, including an array substrate, wherein the array substrate includes:

a first substrate having:

a plurality of sub-pixel regions arranged in an array along a row direction and a column direction;

first wiring regions each of which is located between two adjacent rows of the sub-pixel regions; and second wiring regions each of which is located between two adjacent columns, wherein there is an overlap between the first wiring regions and the second wiring regions;

a plurality of sub-pixel units formed on the first substrate, wherein each of the sub-pixel units includes a pixel electrode at least partially located in a corresponding one of the sub-pixel regions, a common electrode, and a transistor at least partially located in a corresponding one of the first wiring regions, the transistor includes a gate electrode, a first electrode, and a second electrode, the pixel electrode is connected to the first electrode, an orthographic projection of the common electrode on the first substrate overlaps an orthographic projection of the pixel electrode on the first substrate, at least one of the pixel electrode and the common electrode is the electrode structure described above, the row direction is the second direction, and the column direction is the first direction;

a plurality of rows of scan lines formed on the first substrate, wherein at least one row of scan line is located in one of the first wiring regions, and the one row of scan line is connected to the gate electrode and is configured to provide a scan signal to a corresponding one of the sub-pixel units, a plurality of rows of common lines formed on the first substrate, wherein at least one row of common line is located in one of the first wiring regions, and the one row of common line is connected to the common electrode and is configured to provide a common signal to a corresponding one of the sub-pixel units; and a plurality of columns of data lines formed on the first substrate, wherein at least one column of data line is located in one of the second wiring regions, and the one column data line is connected to the second electrode and is configured to provide a data signal to a corresponding one of the sub-pixel units;

wherein an orthographic projection of each of the scan lines on the first substrate and an orthographic projection of each of the common lines on the first substrate do not overlap, an orthographic projection of each of the data lines on the first substrate overlaps the orthographic projection of each of the scan lines on the first substrate and the orthographic projection of each of the common lines on the first substrate.

According to an exemplary embodiment of the present disclosure, the common electrode is located on a side of the pixel electrode away from the first substrate, and the common electrode is the electrode structure.

According to an exemplary embodiment of the present disclosure, at least a part of the data lines has an alignment portion, and the alignment portion is located in an overlap region of one of the first wiring regions and one of the second wiring regions, and an orthographic projection of the alignment portion on the first substrate does not overlap the orthographic projection of each of the common lines and the orthographic projection of each of the scan lines on the first substrate;

wherein the display panel further includes:

a plurality of spacers each located on a side of a corresponding one of the data lines away from the first substrate, wherein an orthographic projection of each of the spacers on the first substrate is located within an orthographic projection of a corresponding one of alignment portions on the first substrate.

According to an exemplary embodiment of the present disclosure, each of the first wiring regions is provided with one row of the scan lines and one row of the common lines, and an orthographic projection of one of the alignment portions on the first substrate is between an orthographic projection of the one row of the scan lines and an orthographic projection of the one row of the common lines on the first substrate.

According to an exemplary embodiment of the present disclosure, each of the at least a part of the data lines further has a first overlap portion and a second overlap portion, an orthographic projection of the first overlap portion on the first substrate overlaps the orthographic projection of the one row of the scan lines on the first substrate, an orthographic projection of the second overlap portion on the first substrate overlaps the orthographic projection of the one row of the common lines on the first substrate;

wherein a distance between the first overlap portion and the alignment portion in the column direction is a first distance, a distance between the second overlap portion and the alignment portion in the column direction is a second distance, and a ratio of the first distance and the second distance to the first width of each of the first electrode bars is 1.5 to 17.

According to an exemplary embodiment of the present disclosure, when the common electrode is the electrode structure according to claim 10, the signal connection bar of the common electrode is located in a corresponding one of the first wiring regions;

the common electrode is located on a side of a corresponding one of the common lines away from the first substrate, and the signal connection bar is connected to the corresponding one of the common lines through a first via structure;

the corresponding one of the common lines has a first segment located outside a corresponding one of the second wiring regions and inside the corresponding one of the first wiring regions, the first segment has a first portion, a second portion and a third portion that are sequentially arranged in the row direction, a side of the third portion away from a corresponding scan line is farther away from the scan line than a side of the first portion away from the scan line, and a side of the second portion away from the scan line is closer to the scan line than the side of the first portion away from the scan line, and a notch is formed between the side of the second portion away from the scan line and the first portion and the third portion;

a part of an orthographic projection of the first via structure on the first substrate overlaps an orthographic projection of the second portion and an orthographic projection of the third portion on the first substrate, and another part of the orthographic projection of the first via structure on the first substrate overlaps an orthographic projection of the notch on the first substrate;

a distance between a boundary line of the first via structure and a boundary line of the third portion in the column direction is a third distance;

a distance between a boundary line of the first via structure and a boundary line of the third portion away from the second portion in the row direction is a fourth distance;

a distance between a boundary line of the first via structure and a boundary line of the second portion away from the third portion in the row direction is a fifth distance; and a ratio of each of the third distance, the fourth distance, and the fifth distance to the first width of each of the first electrode bars is 1 to 6.

According to an exemplary embodiment of the present disclosure, each column of data lines is connected to the first electrode of the transistor in each of one column of sub-pixel units.

According to an exemplary embodiment of the present disclosure, two adjacent first electrodes located on opposite sides of each column of data lines in the row direction have equal distances to the each column of data lines.

According to an exemplary embodiment of the present disclosure, distances in the row direction between first electrodes of transistors in one column of sub-pixel units and a data line which are connected to the first electrodes are equal.

According to an exemplary embodiment of the present disclosure, two adjacent pixel electrodes located on opposite sides of one of the data lines in the row direction are symmetrically arranged with respect to the one of data lines, and two adjacent common electrodes on opposite sides of the one of data lines in the row direction are symmetrically arranged with respect to the one of data lines.

According to an exemplary embodiment of the present disclosure, the display panel further includes: an opposed substrate arranged as opposite to the array substrate and liquid crystal molecules located between the opposed substrate and the array substrate;

the opposed substrate includes a second substrate located on a side of the spacers away from the array substrate and a shielding layer located on a side of the second substrate close to the array substrate, and the shielding layer has cross shielding portions, first shielding portions located on opposite sides of a corresponding one of the cross shielding portions in the row direction, and second shielding portions located on opposite sides of a corresponding one of the cross shielding portions in the column direction;

orthographic projections of the cross shielding portions on the first substrate at least covers intersection regions of the first wiring regions and the second wiring regions, orthographic projections of the first shielding portions on the first substrate at least cover the first wiring regions and are located outside the second wiring regions, and orthographic projections of the second shielding portions on the first substrate at least cover the second wiring regions and are located outside the first wiring regions;

a maximum size of each of the cross shielding portions corresponding to the spacers in the column direction is greater than a maximum size of each of the first shielding portions in the column direction, and a maximum size of each of the cross shielding portions in the row direction is greater a maximum size of each of the second shielding portions in the row direction.

According to an exemplary embodiment of the present disclosure, an orthographic projection of each of the spacers on the second substrate is located in a central area of an orthographic projection of a corresponding one of the cross shielding portions on the second substrate;

a distance between an edge of the orthographic projection of each of the spacers on the second substrate and an edge of the orthographic projection of the corresponding one of the cross shielding portions on the second substrate is a sixth distance, and a ratio of the sixth distance to the first width of each of the first electrode bars is 11 to 33.

According to an exemplary embodiment of the present disclosure, an orthographic projection of each transistor on the first substrate is within an orthographic projection of a corresponding one of the first shielding portions on the first substrate, each pixel electrode has a first ineffective region, and the first ineffective region and a corresponding second electrode are connected by a second via structure;

wherein an orthographic projection of the first ineffective region on the first substrate is located in the orthographic projection of the corresponding one of the first shielding portions on the first substrate, and ratio of a size of the first ineffective region in the column direction to the first width of each of the first electrode bars is 1.5 to 5.5.

According to an exemplary embodiment of the present disclosure, each pixel electrode further has a second ineffective region, and an orthographic projection of the second ineffective region on the first substrate is located within an orthographic projection of a corresponding one of the second shielding portions on the first substrate;

wherein the liquid crystal molecules are negative liquid crystal molecules, and a ratio of a size of the second ineffective region in the row direction to the first width of each of the first electrode bars is 0.3 to 0.5; or wherein liquid crystal molecules are positive liquid crystal molecules, and a ratio of the size of the second ineffective region in the row direction to the first width of each of the first electrode bars is 2 to 5.5.

According to a third aspect of the present disclosure, there is provided a display device including the display panel described above.

It should be understood that the above general description and the following detailed description are only exemplary and explanatory, and should not be construed as constituting any limitation on the present disclosure.

BRIEF DESCRIPTION OF THE DRAWINGS

The drawings, which are incorporated into the specification and constitute a part of the specification, show embodiments that comply with the present disclosure, and are used to explain the principles of the disclosure together with the specification. Obviously, the drawings in the following description only show some embodiments of the present disclosure. For those of ordinary skill in the art, other drawings can be obtained based on these drawings without creative work.

Figure 1:
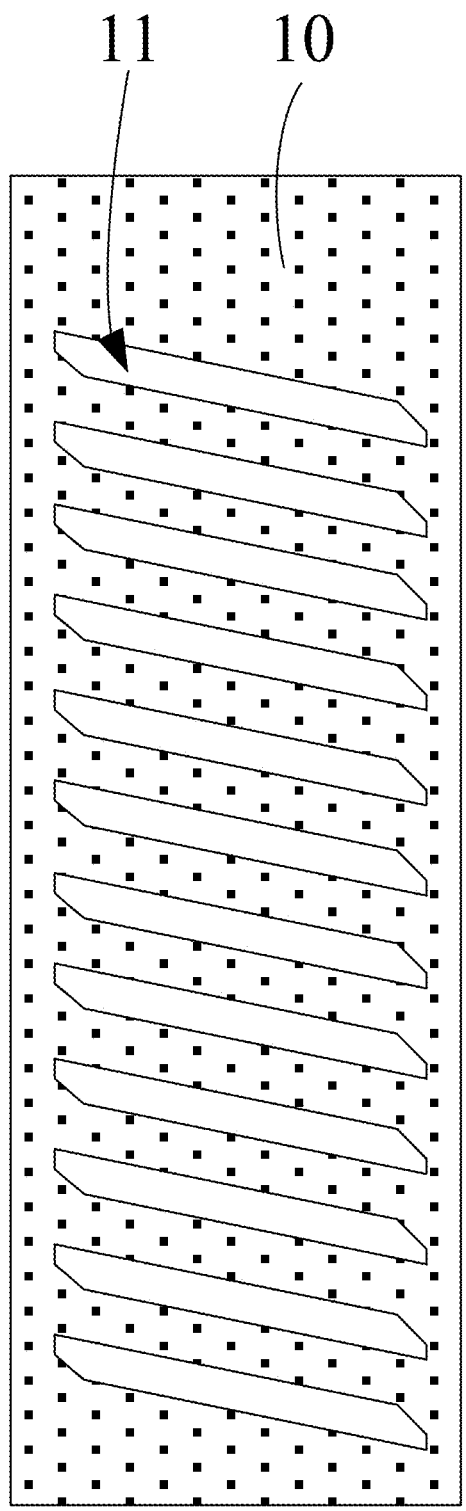
FIG. 1 shows a schematic structural diagram of an electrode structure in related arts.
Figure 9:
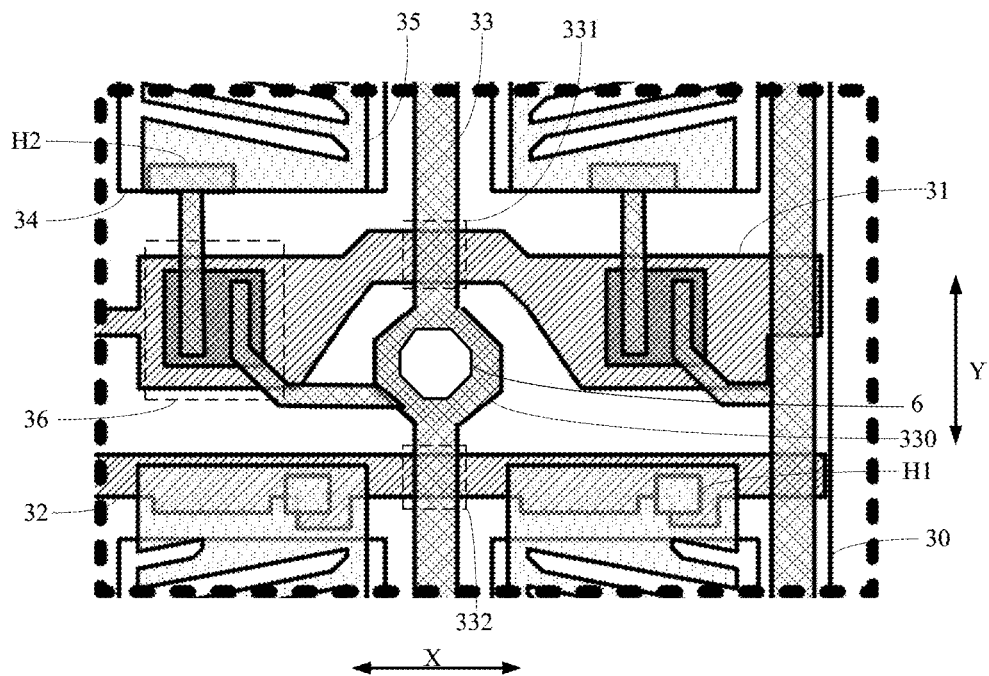
FIG. 9 shows a schematic diagram of a positional relationship between spacers and the array substrate according to an embodiment of the present disclosure.
Figure 10:
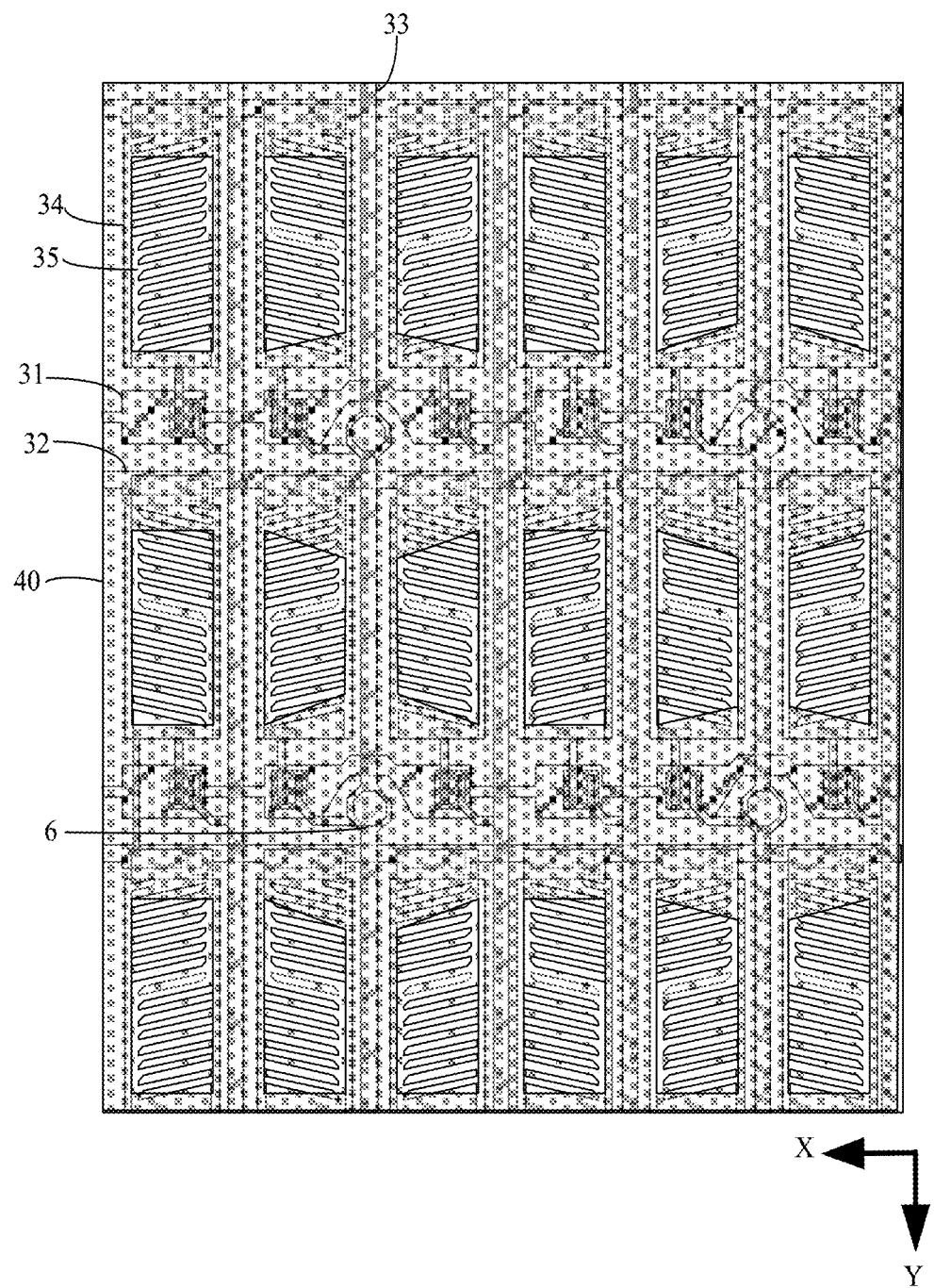
FIG. 10 shows a schematic diagram of a positional relationship between the array substrate, a shielding layer, and a black matrix shown in FIG. 5.

MAIN REFERENCE NUMBERS IN FIG. 1
10: electrode structure; 11: slit;
MAIN REFERENCE NUMBERS IN FIG. 2 TO FIG. 11
20: first electrode portion; 201: first connection bar; 202: first electrode bar; 203: signal connection bar; 21: second electrode portion; 211: second connection bar; 212: second electrode bar; 22: conductive connection portion; 221: first conductive connection bar; 222: second conductive connection bar; 223: third conductive connection bar;
3: array substrate; 30: first substrate; 301: sub-pixel region; 302: first wiring region; 303: second wiring region; 31: scan line; 32: common line; 320: first segment; 3201: first portion; 3202: second portion; 3203: third portion; 321: second segment; 33: data line; 330: alignment portion; 331: first overlap portion; 332: second overlap portion; 34: pixel electrode; 35: common electrode; 36: transistor; 360: active layer; 361: gate electrode; 362: first electrode; 363: second electrode; 4: opposed substrate; 40: shielding layer; 401: cross shielding portion; 402: first shielding portion; 403: second shielding portion; 404: light-transmitting hole; 5: liquid crystal molecules; 6: spacer.

DETAILED DESCRIPTION

In the following, the technical solutions of the present disclosure will be further described in detail through embodiments with reference to drawings. In the specification, the same or similar reference numerals indicate the same or similar components. The following description of the embodiments of the present disclosure with reference to the accompanying drawings is intended to explain the general inventive concepts of the present disclosure, and should not be construed as constituting any limitation to the present disclosure.

In addition, in the following detailed description, for the convenience of explanation, many specific details are set forth to provide a comprehensive understanding of the embodiments of the present disclosure. However, obviously, one or more embodiments can be implemented without these specific details.

In the related arts, the graphic design of an electrode structure 10 in a liquid crystal display panel includes slits 11 that are provided inside the electrode structure 10 and regions around the slits 11 that are closed, as shown in FIG. 1. The light efficiency at the periphery regions of the electrode structure 10 is poor, and it is easily to result in bad display effect.

Figure 2:
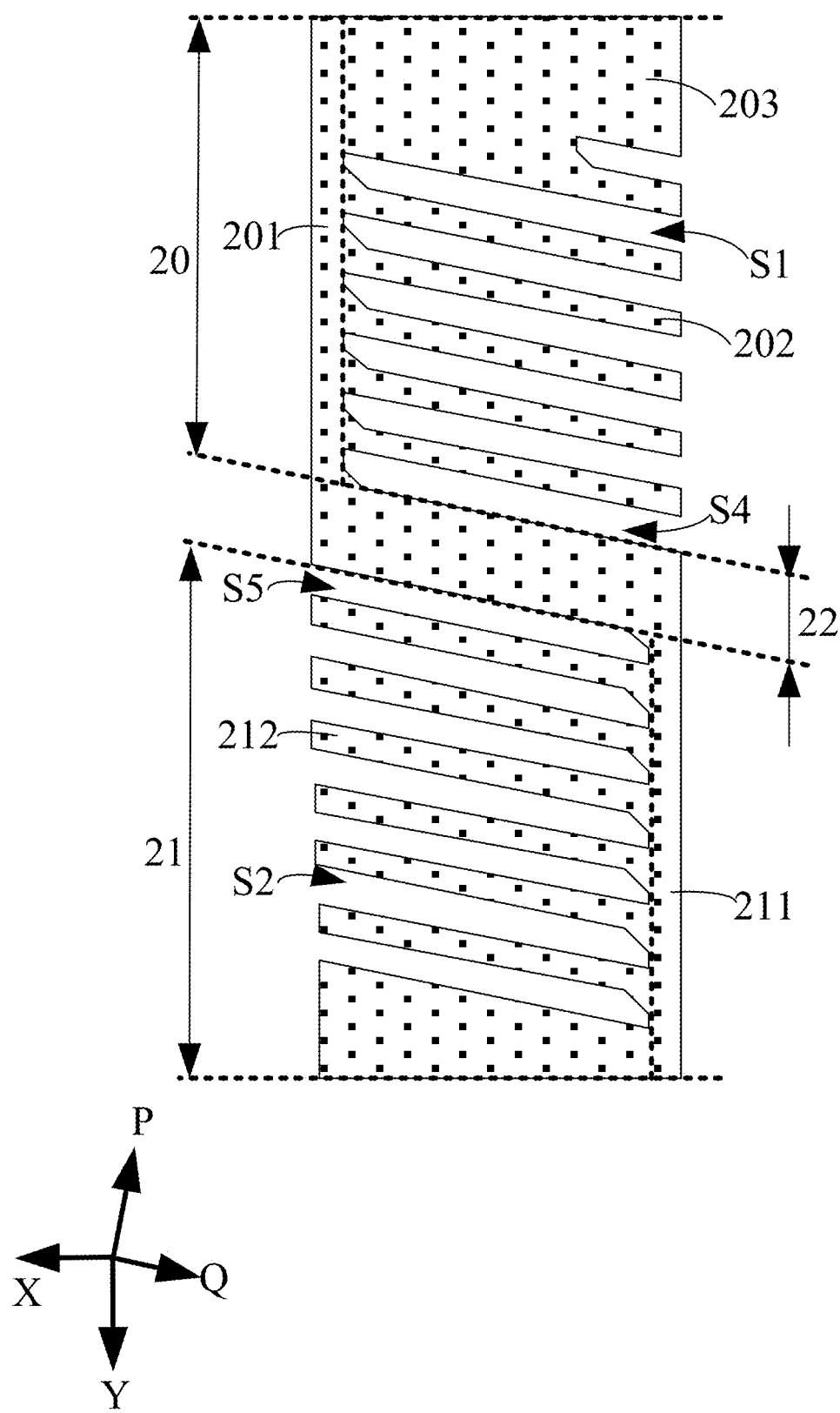
FIG. 2 shows a schematic structural diagram of an electrode structure according to an embodiment of the present disclosure.

To solve the above-mentioned problem, the present disclosure provides an electrode structure, which can be used in a liquid crystal display panel, and can be used as a pixel electrode or a common electrode of the liquid crystal display panel. For example, the electrode structure can be an ITO electrode. As shown in FIG. 2, the electrode structure may include a first electrode portion 20, a conductive connection portion 22, and a second electrode portion 21 that are sequentially arranged in a first direction Y.

The first electrode portion may include a first connection bar 201 extending in the first direction Y and a plurality of first electrode bars 202 arranged at intervals in the first direction Y. The first connection bar 201 has a first side and a second side which are opposite in a second direction X, the plurality of first electrode bars 202 are located on the first side of the first connection bar 201 and connected to the first connection bar 201, and ends of adjacent first electrode bars 202 away from the first connection bar 201 are in an open shape. That is to say, there is no connection between ends of adjacent first electrode bars 202 away from the first connection bar 201.

It should be noted that the aforementioned a plurality of first electrode bars 202 being arranged at intervals in the first direction Y means that there is a first slit S1 between adjacent first electrode bars 202, and the first slits S1 are half-open.

The second electrode portion 21 includes a second connection bar 211 extending in the first direction Y and a plurality of second electrode bars 212 arranged at intervals in the first direction Y, the second connection bar 211 is located at a position on the first side away from the second side, the second connection bar 211 has a third side and a fourth side which are opposite in the second direction X, and the third side is located at a position on the fourth side close to the first side. It should be noted that the second direction X is perpendicular to the first direction Y. The plurality of second electrode bars 212 are located on the third side of the second connection bar 211 and connected to the second connection bar 211, and ends of adjacent second electrode bars 212 away from the second connection bar 211 are in an open shape. That is to say, there is no connection between ends of adjacent second electrode bars 212 away from the second connection bar 211.

It should be noted that the aforementioned a plurality of second electrode bars 212 being arranged at intervals in the first direction Y means that there is a second slit S2 between adjacent second electrode bars 212, and the second slits S1 are half-open.

The conductive connection portion 22 is located between the first electrode portion 20 and the second electrode portion 21, and two ends of the conductive connection portion 22 are connected to the first connection bar 201 and the second connection bar 211, respectively.

In embodiments of the present disclosure, by designing the first electrode portion 20 and the second electrode portion 21 of the electrode structure with half-open first slits S1 and second slits S2, respectively, rotation of liquid crystal molecules can also occur at the opened portions of the first slits S1 and the second slits S2, and thus as compared to the electrode structure in FIG. 1 in which the regions around the slits are closed, the light efficiency around the electrode structure can be improved. In addition, as shown in FIG. 2, one of the first slits S1 of the first electrode portion 20 and the second slits S2 of the second electrode portion 21 has an opening direction toward the right, and the other has an opening direction toward the left. That is, opening directions of the first slits S1 of the first electrode portion 20 and the second slits S2 of the second electrode portion 21 are opposite, so that the light efficiency of the electrode structure on both sides in the second direction X (i.e.: the left and right sides in FIG. 2) can be balanced, and the light efficiency around the electrode structure is more balanced, so as to improve the display effect.

According to some embodiments, the orthographic projections of the first electrode portion 20, the second electrode portion 21, and the conductive connection portion 22 on a reference plane overlap with each other. The overlap here refers to the complete overlap within an allowable error range. This design can reduce the design difficulty of the electrode structure, thereby facilitating the arrangement of multiple electrode structures in the array substrate. However, embodiments of the present disclosure are not limited to this, and for example, the orthographic projections of the first electrode portion 20, the second electrode portion 21 and the conductive connection portion 22 on the reference plane may not overlap, depending on specific circumstances.

It should be noted that the reference plane in embodiments of the present disclosure is a plane perpendicular to the first direction Y.

The first electrode bars 202 and the second electrode bars 212 may be parallel to each other, that is, the extending directions of the first electrode bars 202 and the second electrode bars 212 are parallel to each other, so as to balance the light efficiency at the first electrode portion 20 and the second electrode portion 20. Specifically, the extending directions of the first electrode bars 202 and the second electrode bars 212 may be parallel to a third direction Q. The third direction Q intersects the first direction Y and the second direction X, that is, the third direction Q is not parallel or collinear with the first direction Y and the second direction X. This design can reduce the color shift and improve the display effect.

For example, the acute angle between the third direction Q and the second direction X may be 5° to 15°, such as 5°, 7°, 9°, 11°, 13°, 15°, and so on.

According to some embodiments, a first width of each of the first electrode bars 202 can be equal to a first width of each of the second electrode bars 212. In addition, a first width of each of the first slits S1 can be equal to a first width of each of the second slits S2, so that the light efficiency at the first electrode portion 20 and the second electrode portion 21 can be further balanced to improve the display effect of the product.

It should be noted that the first width mentioned in the present disclosure refers to the size in a fourth direction P, and the fourth direction P and the third direction Q are perpendicular to each other.

In order to ensure good rotation of the liquid crystal molecules at the first electrode portion 20 and the second electrode portion 21 and thus to improve the light efficiency at the first electrode portion 20 and the second electrode portion 21, the first width of each of the first electrode bars 202, the first width of each of the first slits S1, the first width of each of the second electrode bars 212, and the first width of each of the second slits S2 may meet certain requirements; that is, a ratio of the first width of each of the first slits S1 to the first width of each of the first electrode bars 202 can be 1 to 4, such as 1, 1.5, 2, 2.5, 3, 3.5, 4, and so on.

Specifically, the first width of each of the first electrode bars 202 and the second electrode bars 212 in embodiments of the present disclosure may be 1.8 μm to 3 μm, such as 1.8 μm, 2 μm, 2.2 μm, 2.4 μm, 2.6 μm, 2.8 μm, 3 μm, and so on. The first width of each of the first slits S1 and the second slits S2 may be 3 μm to 7 μm, such as 3 μm, 3.5 μm, 4 μm, 4.5 μm, 5 μm, 5.5 μm, 6 μm, 6.5 μm, 7 μm, and so on.

In addition, in order to further balance the light efficiency at the first electrode portion 20 and the second electrode portion 21 to improve the display effect of the product, a second width of the first connection bar 201 and a second width of the second connection bar 211 may be equal. The second width of the first connection bar 201 and the second width of the second connection bar 211 may be equal to the first width of each of the first electrode bars 202 and the first width of each of the second electrode bars 212. However, embodiments of the present disclosure are not limited to this, and for another example, the second width of the first connection bar 201 and the second width of the second connection bar 211 may be slightly larger than the first width of each of the first electrode bars 202 and the first width of each of the second electrode bars 212, so as to improve the light efficiency, while avoiding a situation in which disconnections of the first connection bar 201 and the second connection bar 211 tend occur due to the too small first width, thereby increasing the product yield.

It should be noted that the second width mentioned in embodiments of the present disclosure is a size in the second direction X.

The first electrode portion 20 and the second electrode portion 21 of the electrode structure are connected by the conductive connection portion 22. In order to avoid the conductive connection portion 22 from being affected by impurity particles during the manufacturing process and thereby avoid disconnection to occurs, in some embodiments of the present disclosure, the area of the conductive connection portion 22 is designed to be large to avoid the situation that the conductive connection portion 22 is easily to be broken and may thus cause pixels to fail. According to some embodiments of the present disclosure, the area of the conductive connection portion 22 is larger than the area of each of the first electrode bars 202 and the area of each of the second electrode bars 212.

It should be understood that the overall extending direction of the conductive connection portion 22 can also be parallel to the third direction to reduce the difficulty in processing and design. For example, when the orthographic projection of the conductive connection portion 22 on the reference plane overlaps the orthographic projection of the first electrode portion 20 and the orthographic projection of the second electrode portion 21 on the reference plane, in order to make the area of the conductive connection portion 22 larger than the area of each of the first electrode bars 202 and the area of each of the second electrode bars 212, the first width of each of the first electrode bars 202 and the first width of each of the second electrode bars 212 can be smaller than the first width of the entire conductive connection portion 22 in some embodiments of the present disclosure.

Figure 3:
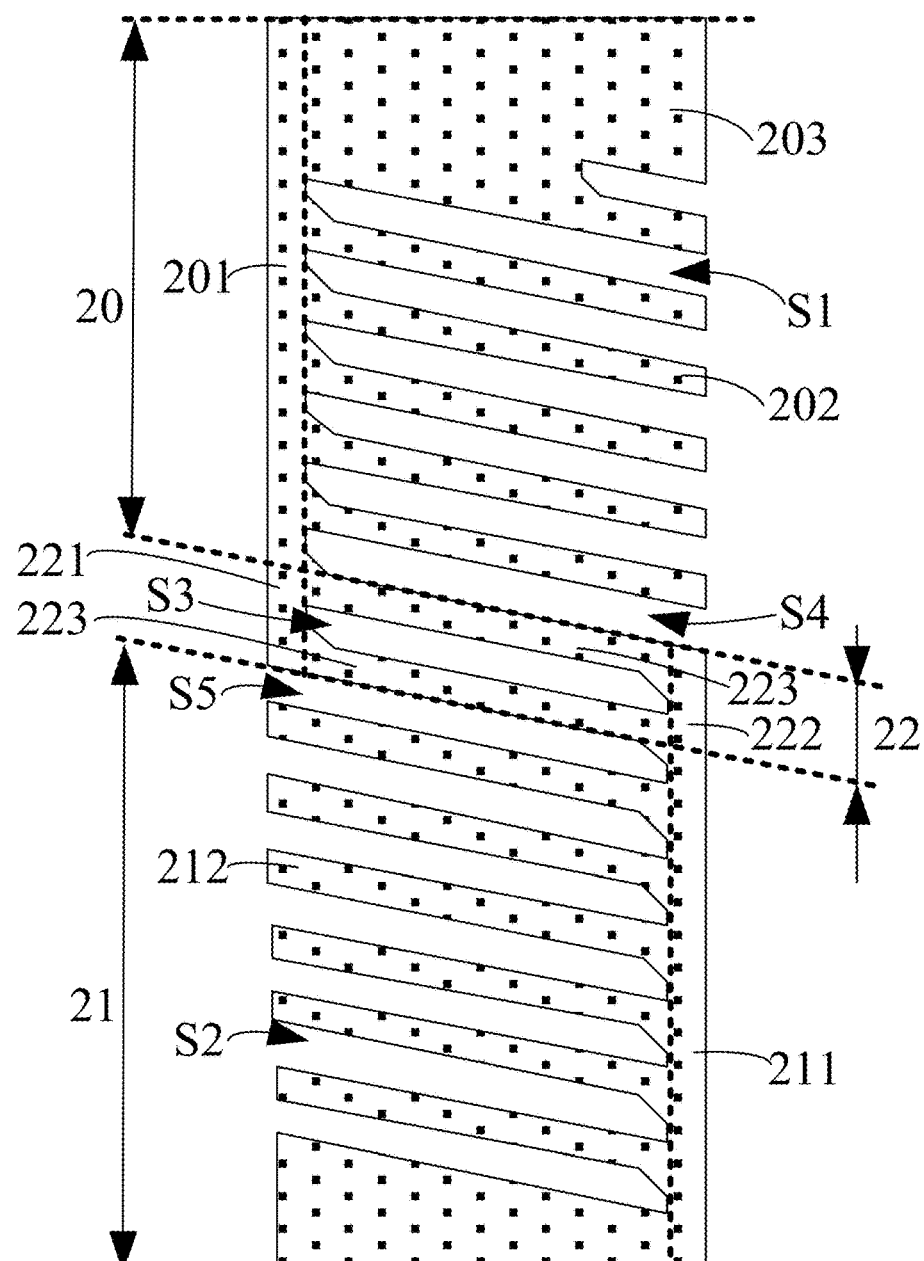
FIG. 3 shows a schematic structural diagram of an electrode structure according to another embodiment of the present disclosure.

In an embodiment of the present disclosure, as shown in FIG. 3, the conductive connection portion 22 may include a first conductive connection bar 221, a second conductive connection bar 222, and at least two third conductive connection bars 223. The first conductive connection 221 and the second conductive connection bar 222 both extend in the first direction Y, and the first conductive connection bar 221 and the second conductive connection bar 222 are arranged at intervals in the second direction X. The first conductive connection bar 221 is connected to the first connection bar 201, and the second conductive connection bar 222 is connected to the second connection bar 211. The at least two third conductive connection bars 223 are arranged at intervals in the first direction Y and are located between the first conductive connection bar 221 and the second connection bar 221. Two ends of each third conductive connection bar 223 (that is, the two ends in the extending direction) are connected to the first conductive connection bar 221 and the second conductive connection bar 222, respectively, in other words, there is a third slit S3 between the adjacent third conductive connection bars 223, and the third slit S3 is closed.

In embodiments of the present disclosure, the slit (that is, the third slit S3) is provided in the conductive connection portion 22, on the one hand, this can reduce the light efficiency loss at the conductive connection portion 22, thereby improving the overall light efficiency of the electrode structure. On the other hand, the first electrode portion 20 and the second electrode portion 21 can be connected and conducted through at least two wires (i.e.: the third conductive connection bars 223), and thus even if one of the wires is broken due to particles, the other wire can be used to connect the first electrode portion 20 and the second electrode portion 21, thereby greatly reducing the occurrence rate of pixel failure, and thus improving the product yield.

According to some embodiments, two third conductive connection bars 223 are provided to ensure stable connection and conduction between the first electrode portion 20 and the second electrode portion 21, and also, the proportion of the conductive connection portion 22 in the electrode structure can be appropriately reduced. That is, more design space is provided for the first electrode portion 20 and the second electrode portion 21. In other words, the area of the first electrode portion 20 and the area of the second electrode portion 21 can be larger than the area of the conductive connection portion 22. Because the slits in the first electrode portion 20 and the second electrode portion 21 are half-open, and the slit in the conductive connection portion 22 is closed, the light efficiency at the first electrode portion 20 and the second electrode portion 21 is better than that of the conductive connection portion 22. In this way, by making the area of the first electrode portion 20 and the area of the second electrode portion 21 larger than the area of the conductive connection portion 22, the overall light efficiency of the electrode structure can be improved, and the product quality can be improved. In addition, the providing of the third slit S3 can also alleviate the situation that particles fall on the conductive connection portion 22 during the manufacturing process, thereby alleviating the increase in the resistance of the conductive connection portion 22 due to the particles, and accordingly reducing the influence on the driving of the pixels.

However, it should be understood that the number of the third conductive connection bars 223 is not limited to two, and can also be three, four, and so on, depending on specific situations.

In order to further reduce the proportion of the conductive connection portion 22 in the electrode structure, the length of the first conductive connection bar 221 and the length of the second conductive connection bar 222 are both smaller than the length of the first connection bar 201 and smaller than the length of the second connection bar 211. It should be understood that the length mentioned here is the size in the first direction Y.

According to some embodiments, the second width of the first conductive connection bar 221 and the second width of the first connection bar 201 may be equal, and the second width of the second conductive connection bar 222 and the second width of the second connection bar 211 may be equal.

In embodiments of the present disclosure, the extending directions of the third conductive connection bars 223 and the third direction Q are parallel to each other. The first width of each of the third conductive connection bars 223 may be equal to the first width of each of the first electrode bars 202. In addition, the third slit S3 between the adjacent third conductive connection bars 223 may be the same as a first slit S1 between adjacent first electrode bars 202 and a second slit S2 between adjacent second electrode bars 212. In this way, the light efficiencies at the conductive connection portion 22, the first electrode portion 20 and the second electrode portion 21 can be balanced, so as to improve the display effect of the product.

Further, a slit between the third conductive connection bars 223 and the first electrode bars 202 is a fourth slit S4, a slit between the third conductive connection bars 223 and the second electrode bars 212 is a fifth slit S5, and each of the fourth slit S4 and the fifth slit S5 is equal to the previously mentioned first slit S1, second slit S2 and the third slit S3. In this way, the light efficiency at the conductive connection portion 22, the first electrode portion 20, the second electrode portion 21, and regions between them can be balanced, thereby improving the display effect of the product.

In another embodiment of the present disclosure, as shown in FIG. 2, the conductive connection portion 22 may be a conductive connection bar extending in the third direction Q. The ratio of the first width of the conductive connection bar to the first width of each of the first electrode bars 202 may be 1.5 to 5.5, that is, the conductive connection portion 22 is wider than each of the first electrode bars 202, so as to avoid the breakage of the conductive connection portion 22, and ensure product quality.

For example, when the conductive connection portion 22 is only one conductive connection bar, the first width of the conductive connection bar may be 5 μm to 10 μm, such as 5 μm, 6 μm, 7 μm, 8 μm, 9 μm, 10 ||m, and so on.

In an embodiment of the present disclosure, as shown in FIGS. 2 and 3, the first electrode portion 20 further includes a signal connection bar 203, which is located on the first side of the first connection bar 201 and is connected to the first connection bar 201, and is located on a side of the plurality of first electrode bars 202 away from the conductive connection portion 22. For example, when the electrode structure of the present disclosure is a common electrode, the signal connection bar 203 can be connected to a common line in the array substrate, that is, the signal connection bar 203 can be used to receive a common signal. However, embodiments of the present disclosure are not limited to this. When the electrode structure of the present disclosure is a pixel electrode, the signal connection bar 203 can be connected to source and drain electrodes of a transistor in the array substrate for receiving signals transmitted from the source and drain electrodes, such as data signals.

It should be noted that the dotted lines in FIG. 2 and FIG. 3 have no practical meaning, and are only used to distinguish the aforementioned structures to facilitate understanding of the positional relationship between the aforementioned structures. It should be understood that, the electrode structure mentioned in embodiments of the present disclosure is an integral structure as a whole.

Figure 4:
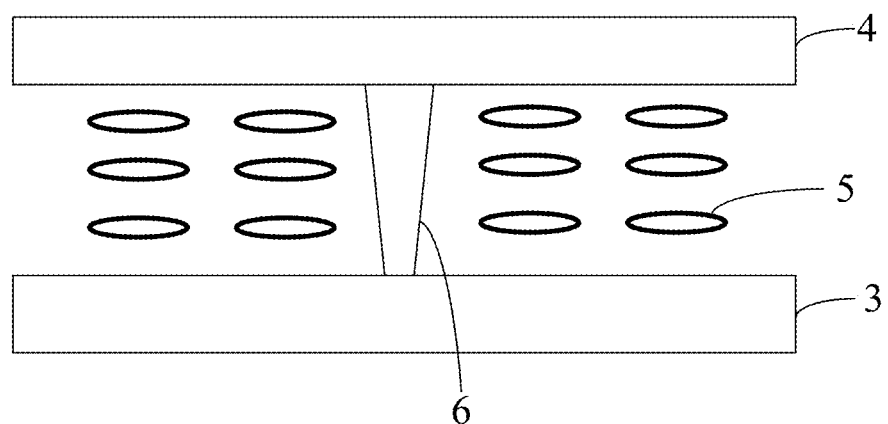
FIG. 4 shows a schematic diagram of a partial structure of a display panel according to an embodiment of the present disclosure.

An embodiment of the present disclosure also provides a display panel, which may be a liquid crystal display panel. As shown in FIG. 4, the display panel may include an array substrate 3, an opposed substrate 4 arranged opposite to the array substrate 3, and liquid crystal molecules 5 and a plurality of spacers 6 between the opposed substrate 4 and the array substrate 3. The arrangement of the plurality of spacers 6 can improve the uniformity of the overall thickness of the display panel, and improve the tolerance of the display panel to the fluctuation of liquid crystal molecules, thereby improving the yield of the display panel.

For example, the liquid crystal molecules 5 may be negative liquid crystal molecules, but the present disclosure is not limited to this, and according to some other embodiments, the liquid crystal molecules 5 may be positive liquid crystal molecules. The plurality of spacers 6 may include main spacers and auxiliary spacers. When the display panel does not receive external pressure, two ends of the main spacers can be in contact with the array substrate 3 and the opposed substrate 4 respectively, to mainly play a supporting role. When the display panel does not receive external pressure, if the auxiliary spacers are formed on the opposed substrate 4, there is a certain distance between the auxiliary spacers and the array substrate 1. That is to say, there is a step difference (height difference) between the main spacers and the auxiliary spacers. The thickness of the display panel can be fine-tuned by adjusting the step difference between the main spacers and the auxiliary spacers. For example, the height of each of the main spacers is greater than the height of each of the auxiliary spacers. When the display panel is subjected to external pressure, the main spacers first bear all the pressure and are compressed. When the main spacers are compressed until the step difference between the main spacers and the auxiliary spaces drops to 0, the main spacers and the auxiliary spacers can bear the external pressure together.

It should be noted that the two kinds of spacers, i.e., the main spacers and auxiliary spacers, can be arranged according to a certain period. The sizes and heights of different types of spacers need to be monitored during the manufacturing process. Because the size of each spacer is small and there are relatively smaller number of main spacers, it is hard to accurately identify positions of the main spacers by a device only depending on the sizes. Usually, the spacer design is vacant at a certain position around a main spacer (i.e., no spacer is provided) to facilitate faster and more accurate identification of the main spacer position and monitor the position. For example, during the design, no spacer should be placed under the main spacers, and when monitoring is performed, the positions where no spacer is set can be first quickly determined, and then according to the aforementioned design rules, it can be determined that the spacers above the positions where no spacer is set are the main spacers.

In embodiments of the present disclosure, the array substrate 3 may include a first substrate 30, a plurality of sub-pixel units formed on the first substrate 30, a plurality of rows of scan lines 31, a plurality of rows of common lines 32, and a plurality of columns of data lines 33.

Figure 5:
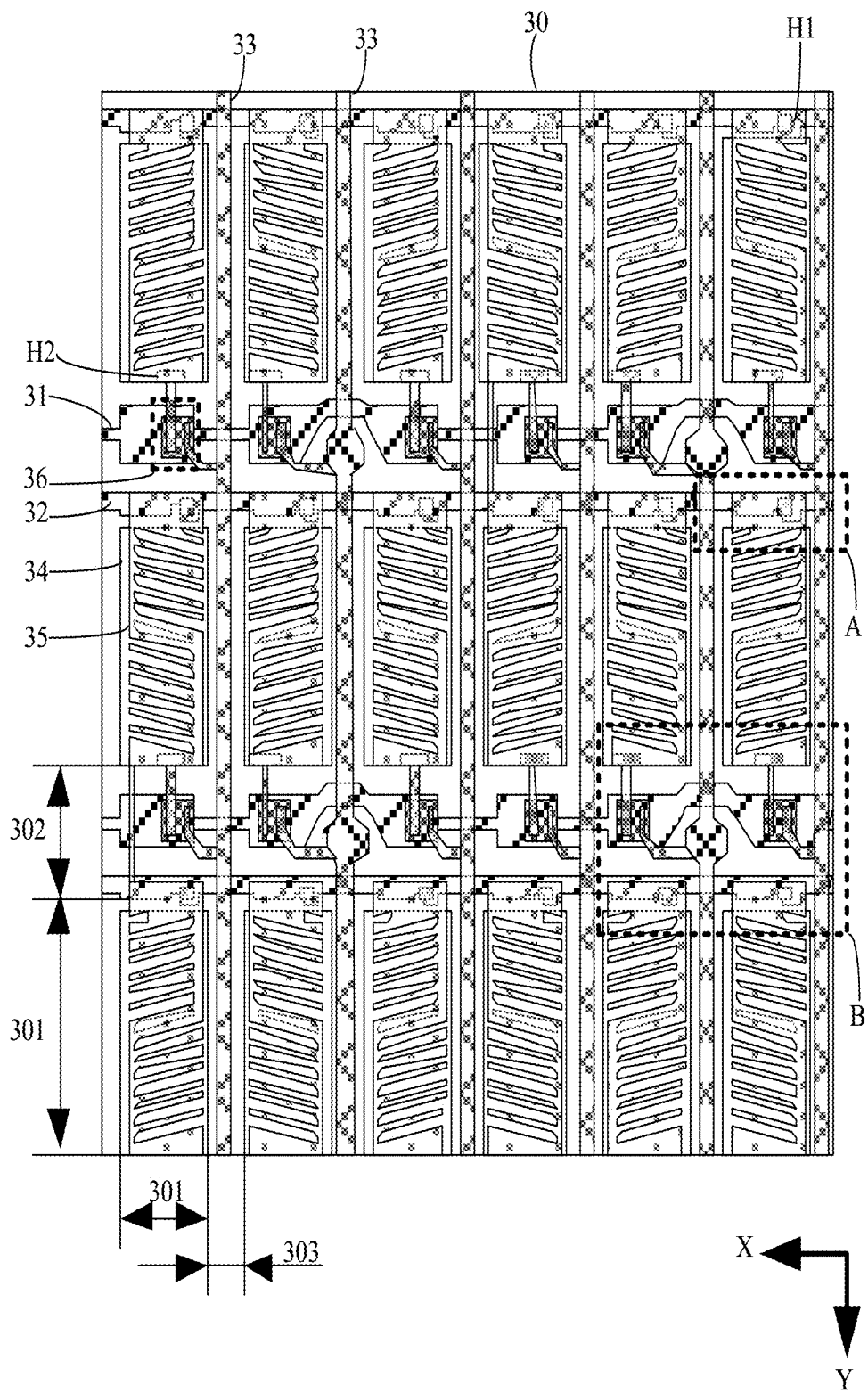
FIG. 5 shows a schematic structural diagram of an array substrate in a display panel according to an embodiment of the present disclosure.

As shown in FIG. 5, the first substrate 30 has: a plurality of sub-pixel regions 301 arranged in an array along a row direction X and a column direction Y; first wiring regions 302 each of which is located between two adjacent rows of the sub-pixel regions 301; and second wiring regions 303 each of which is located between two adjacent columns. There is an overlap between the first wiring regions 302 and the second wiring regions 303. For example, the first substrate 30 may have a single-layer structure, and the material of the first substrate 30 may be glass. However, the present disclosure is not limited to this. According to some other embodiments, the first substrate 30 may have a multi-layer structure; and the material of the first substrate 30 is not limited to glass, and may be other materials, such as polyimide (PI), etc., depending on the specific situations.

A plurality of sub-pixel units are formed on the first substrate 30. Each of the sub-pixel units includes a pixel electrode 34 at least partially located in a corresponding one of the sub-pixel regions 301, a common electrode 35, and a transistor 36 at least partially located in a corresponding one of the first wiring regions 302. In addition, each of the sub-pixels units may further include a capacitor (not shown in this figure).

Figure 6:
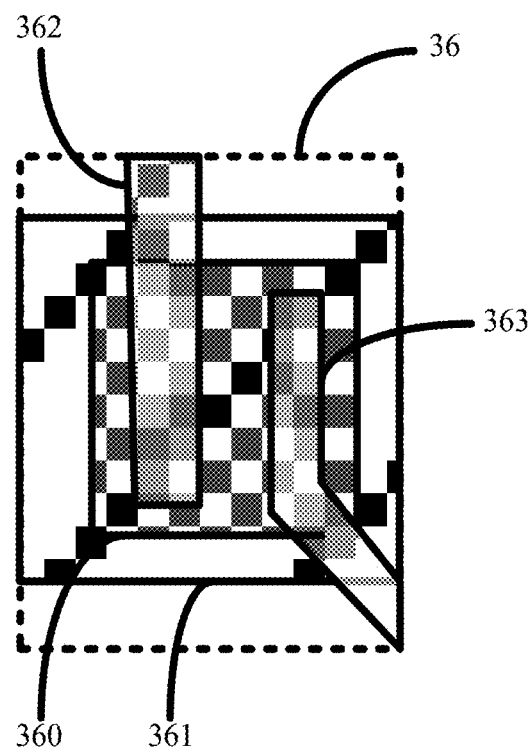
FIG. 6 shows a schematic diagram of an enlarged structure of the transistor shown in FIG. 5.

In an embodiment of the present disclosure, as shown in FIG. 6, the transistor 36 may include an active layer 360, a gate electrode 361, and a first electrode 362 and a second electrode 363 arranged in the same layer. An insulating layer 37 is provided between the gate electrode 361 and the active layer 360 to insulate the gate electrode 361 and the active layer 360 from each other. The insulating layer 37 can be made of inorganic materials, such as silicon oxide, silicon nitride and other inorganic materials. It should be noted that the gate electrode 361 may be provided in the same layer as the scan lines 31, and the gate electrode 361 may belong to a part of the scan lines 31 mentioned above.

The transistor 36 may be a top-gate type or a bottom-gate type. In the embodiments of the present disclosure, the transistor 36 of a bottom-gate type is taken as an example for description. When the transistor 36 is of the bottom-gate type, the gate electrode 361 is formed on the first substrate 30. The gate electrode 361 may include metal materials or alloy materials, such as molybdenum, aluminum, and titanium, to ensure good conductivity. The insulating layer is formed on the first substrate 30 and covers the gate electrode 361. The insulating layer can be made of inorganic materials, such as silicon oxide or silicon nitride. The active layer 360 is formed on a side of the insulating layer away from the first substrate 30. The first electrode 362 and the second electrode 363 are connected to the two doped regions of the active layer 360, respectively. The first electrode 362 and the second electrode 363 may include a metal material or an alloy material, such as metal single-layer or multi-layer structure formed of molybdenum, aluminum, titanium, and so on. For example, the multi-layer structure is a multi-metal laminate layer, such as a laminate layer formed by three metal layers of titanium, aluminum, and titanium (Al/Ti/Al).

It should be understood that the number of transistors 36 in each sub-pixel unit may be more than one, and the transistors 36 may be classified into N-type and P-type.

In embodiments of the present disclosure, the pixel electrode 34 may be connected to the first electrode 362. When the transistor 36 connected to the pixel electrode 34 is of the N-type, the first electrode 362 of the transistor 36 may be a drain electrode and the second electrode 363 may be a source electrode. When the transistor 36 connected to the pixel electrode 34 is the P-type, the first electrode 362 of the transistor 36 may be a source electrode, and the second electrode 363 may be a drain electrode. The orthographic projection of the common electrode 35 on the first substrate 30 overlaps the orthographic projection of the pixel electrode 34 on the first substrate 30. At least one of the pixel electrode 34 and the common electrode 35 is the electrode structure described in any of the foregoing embodiments, so that the light efficiency around the pixels can be improved, and the product quality can be improved. It should be noted that the row direction X mentioned in this embodiment can be parallel to the aforementioned second direction X, and the column direction Y can be the aforementioned first direction Y.

In embodiments of the present disclosure, the pixel electrode 34 may be located on a side of the common electrode 35 close to the first substrate 30, that is, the pixel electrode 34 may be fabricated on the first substrate 30 before the common electrode 35 is fabricated. For example, the pixel electrode 34 can be a plate-shaped electrode; that is, the pixel electrode 34 is a whole piece without slits; and the common electrode 35 can be the electrode structure described in any of the foregoing embodiments. Through the electric field generated between the pixel electrode 34 and the common electrode 35, all the liquid crystal molecules between the electrodes and directly above the electrodes rotate, which can improve the working efficiency of the liquid crystal and increase the light transmission efficiency. However, the present disclosure is not limited to this. According to some other embodiment, the pixel electrode 34 may be located on a side of the common electrode 35 away from the first substrate 30. The pixel electrode 34 is the electrode structure described in any of the foregoing embodiments, and the common electrode 35 is a plate electrode.

It should be noted that, embodiments of the present disclosure are described mainly using the example in which the pixel electrode 34 is located on the side of the common electrode 35 close to the first substrate 30, the pixel electrode 34 may be a plate-shaped electrode, and the common electrode 35 may be the electrode structure described in any of the foregoing embodiments.

In order to ensure the light transmittance of the array substrate, the pixel electrode 34 can be made of ITO material. However, the present disclosure is not limited to this. According to some other embodiments, the pixel electrode 34 can be made of transparent materials such as indium zinc oxide (IZO), or zinc oxide (ZnO). Since the material of the pixel electrode 34 is different from that of the gate electrode 361, the first electrode 362 and the second electrode 363 of the transistor 36, the pixel electrode 34 may fabricated by using a patterning process different from the patterning process used for fabricating the gate electrode 361, the first electrode 362 and the second electrode 363 of the transistor 36.

For example, the pixel electrode 34 may be located on a side of the first electrode 362 and the second electrode 363 of the transistor 36 close to the first substrate 30. As shown in FIG. 5, the pixel electrode 34 may be connected to the first electrode 362 of the transistor 36 through a second via structure H2. The pixel electrode 34 can be formed on the first substrate 30 before the gate electrode 361 of the transistor 36 is formed. That is to say, when the array substrate is fabricated, a patterning process can be used to form the pixel electrode 34 on the first substrate 30, and then another patterning process is used to form the gate electrode 361 of the transistor 36 on the first substrate 30. It should be noted that although both the pixel electrode 34 and the gate electrode 361 are formed on the first substrate 30, the pixel electrode 34 and the gate electrode 361 are disconnected from each other (that is, there is no connection between them). However, the present disclosure is not limited to this. According to some other embodiments, the pixel electrode 34 can be formed on the first substrate 30 after the gate electrode 361 of the transistor 36 is formed, and the pixel electrode 34 can be located on a side of the gate electrode 361 away from the first substrate 30.

Similarly, in order to ensure the light transmittance of the array substrate, the common electrode 35 can be made of transparent conductive materials such as ITO. The common electrode 35 can be formed on a side of the first electrode 362 and the second electrode 363 of the transistor 36 away from the first substrate 30. It should be understood that there is an insulating layer between the common electrode 35 and the first electrode 362 and the second electrode 363 of the transistor 36.

At least one row of scan line 31 may be located in a first wiring region 302. In other words, each first wiring region 302 may be provided with at least one row of scan line 31. The scan lines 31 are connected to the gate electrodes 361 of the transistors 36 in the sub-pixel units. The scan lines 31 can be arranged on the same layer as the gate electrodes 361 of the transistors 36 and may be formed as an integrated structure with the gate electrodes 361 of the transistors. The scan lines are configured to provide scan signals to the sub-pixel units.

At least one row of common line 32 may be located in a first wiring region 302. In other words, each first wiring region 302 may be provided with at least one row of common line 32. The common lines 32 are connected to the common electrodes 35 and are configured to provide common signals to the sub-pixel units. For example, the common lines 32 can be arranged in the same layer as the scan lines 31, that is, the common lines 32 can be located on a side of the common electrodes 35 close to the first substrate 30. As shown in FIG. 5, the common lines 32 can be connected to the common electrodes 35 through first via structures H1. Specifically, each common line 32 can be connected to the signal connection bar of a corresponding common electrode 35 through a first via structure H1. It should be understood that the signal connection bar may be located in the first wiring region 302.

Figure 7:
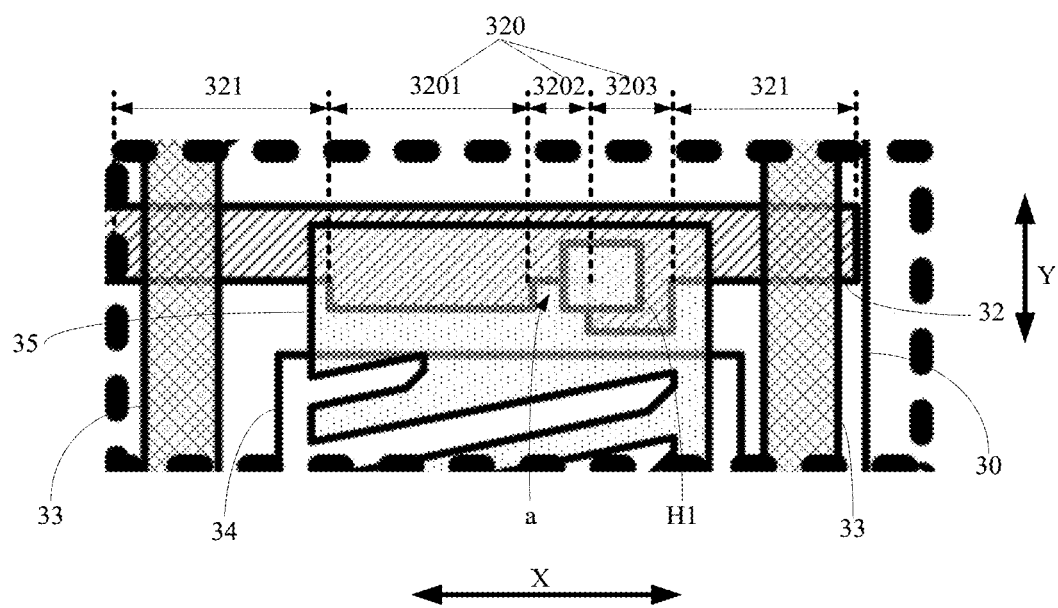
FIG. 7 shows a schematic diagram of an enlarged structure of part A in FIG. 5.

In an embodiment of the present disclosure, as shown in FIG. 7, each common line 32 has first segments 320 each of which is located outside the second wiring region 303 and inside the first wiring region 302. The first segments 320 are arranged at intervals in the row direction X and are connected via second segments 321. A part of each segment 321 is located in the second wiring region 303, and the other part is located in the first wiring region 302.

Specifically, as shown in FIG. 7, each first segment 320 of the common line 32 may have a first portion 3201, a second portion 3202, and a third portion 3203 arranged in the row direction X in sequence. A side of the third portion 3203 away from a corresponding scan line 31 is farther away from the scan line 31 than a side of the first portion 3201 away from the scan line 31. A side of the second portion 3202 away from the scan line 31 is closer to the scan line 31 than the side of the first portion 3201 away from the scan line 31. A notch a is formed between the side of the second portion 3202 away from the scan line 31 and the first portion 3201 and the third portion 3203. That is, when a side of the first segment 320 close to the scan line 31 is a straight line extending in the direction X, the size of the third portion 3203 in the column direction Y is larger than the size of the first portion 3201 in the column direction Y, that is, the third portion 3203 is arranged protrudingly compared to the first portion 3201. The size of the second portion 3202 in the column direction Y is smaller than the size of the first portion 3201 in the column direction Y. The second portion 3202 is retracted as compared with the first portion 3201 and the third portion 3203. Therefore, the notch a may be formed between the first portion 3201, the second portion 3202 and the third part 3203; that is, the common line 32 is not straight, and has both a notch a and a protruding part.

As shown in FIG. 7, a part of the orthographic projection of one of the first via structures H1 on the first substrate 30 overlaps the orthographic projection of the second portion 3202 and the orthographic projection the third portion 3203 on the first substrate 30, and the other part overlaps the orthographic projection of the notch a on the first substrate 30. This relationship can be understood as that the first via structure H1 at the common line 32 is a half via design, that is, a part of the first via structure H1 is orthographically projected on the common line 32, and the other part is projected on the notch a. This design ensures that the first via structure H1 is located on the common line 32, and can also improve the diffusion uniformity of the alignment layer PI.

Further, a distance between a boundary line of the first via structure H1 and a boundary line of the third portion 3203 in the column direction Y is a third distance, a distance between a boundary line of the first via structure H1 and a boundary line of the third portion 3203 away from the second portion 3202 in the row direction X is a fourth distance, and a distance between a boundary line of the first via structure H1 and a boundary line of the second portion 3202 away from the third portion 3203 in the row direction X is a fifth distance. In order to ensure that the first via structure H1 can be formed on the common line 32, a ratio of the aforementioned third, fourth, and fifth distance to the first width of each of the first electrode bars 202 may be 1 to 6, such as, 1, 2, 3, 4, 5, 6, and so on. For example, each of the third, fourth, and fifth distance can be 3 μm to 10 μm, such as, 3 μm, 5 μm, 7 μm, 10 μm, and so on.

For example, as shown in FIG. 5, each first wiring region 302 may be provided with one scan line 31 and one common line 32. It should be understood that the scan line 31 and the common line 32 are disconnected from each other. That is, the orthographic projection of the scan line 31 on the first substrate 30 and the orthographic projection of the common line 32 on the first substrate 30 do not overlap. It should be noted that the first wiring region 302 is not limited to having one scan line 31 and one common line 32, and according to some other embodiments, two scan lines 31 or no common lines 32 can be provided, depending on the specific situations. The embodiments of the present disclosure are described by using the example in which one scan line 31 and one common line 32 are arranged in each first wiring region 302.

At least one data line 33 can be located in a second wiring region 303. In other words, at least one data line 33 is provided in each second wiring region 303. This data line 33 can be connected to the second electrodes 363 of the transistors 36 in the sub-pixel units, and the data line 33 is configured to provide data signals to the sub-pixel units. The orthographic projection of the data line 33 on the first substrate 30 overlaps the orthographic projection of the scan line 31 and the orthographic projection of the common line 32 on the first substrate 30. It should be noted that the data line 33 in the embodiment of the present disclosure can be arranged in the same layer as the first electrodes 362 and the second electrodes 363 of the transistors 36 in the sub-pixel units, that is, the data line 33, the first electrodes 362 and the second electrodes 363 can be made by the same patterning process to reduce the mask cost. However, the present disclosure is not limited to this. According to some other embodiments, the data line 36 and the first electrodes 362 and the second electrodes 363 can made with different patterning processes, depending on the specific situations.

For example, as shown in FIG. 5, each second wiring region 303 can be provided with one data line 33, and this data line 33 can be connected to the second electrode 363 of each sub-pixel unit in the same column, that is, the data line 33 can provide data signals for the sub-pixel units in the same column.

Each data line 33 may be symmetrically arranged with respect to its central axis. It should be noted that the central axis mentioned here is a line that passes through the center of the data line 33 and extends in the column direction Y.

According to some embodiments, two adjacent first electrodes 362 located on opposite sides of each data line 33 in the row direction X have equal distances to the each data line in the row direction, so as to ensure that the coupling capacitances between the data line 33 and the transistors 36 at both sides are close to be the same, thereby ensuring the uniformity of the light efficiency on both sides of the data line 33.

In the same way, two adjacent pixel electrodes 34 located on opposite sides of one of the data lines 33 in the row direction X are symmetrically arranged with respect to the one of data lines 33, and two adjacent common electrodes 35 on opposite sides of the one of data lines 33 in the row direction X are symmetrically arranged with respect to the one of data lines 33, so as to ensure that the coupling capacitances between the data line 33 and the pixel electrodes 34 and the common electrodes 35 on both sides are close to the same, thereby ensuring the uniformity of light efficiency on both sides of the data line 33.

According to some embodiments, in a column of sub-pixel units, the distances in the row direction X between the first electrodes 362 of the sub-pixel units and a data line 33 connected to these first electrodes 362 are equal, so as to ensure that the coupling capacitances between transistors 36 in the column of sub-pixel units and the data line 33 are close to be the same, thereby ensuring the uniformity of the light efficiency at each sub-pixel unit in each column. It should be noted that while the distances in the row direction X between the first electrodes 362 of the column of sub-pixel units and the data line 33 connected to these first electrodes 362 are equal, the overlap area between the column of first electrodes 362 and the gate electrodes 361 should be consistent with other columns.

Figure 8:
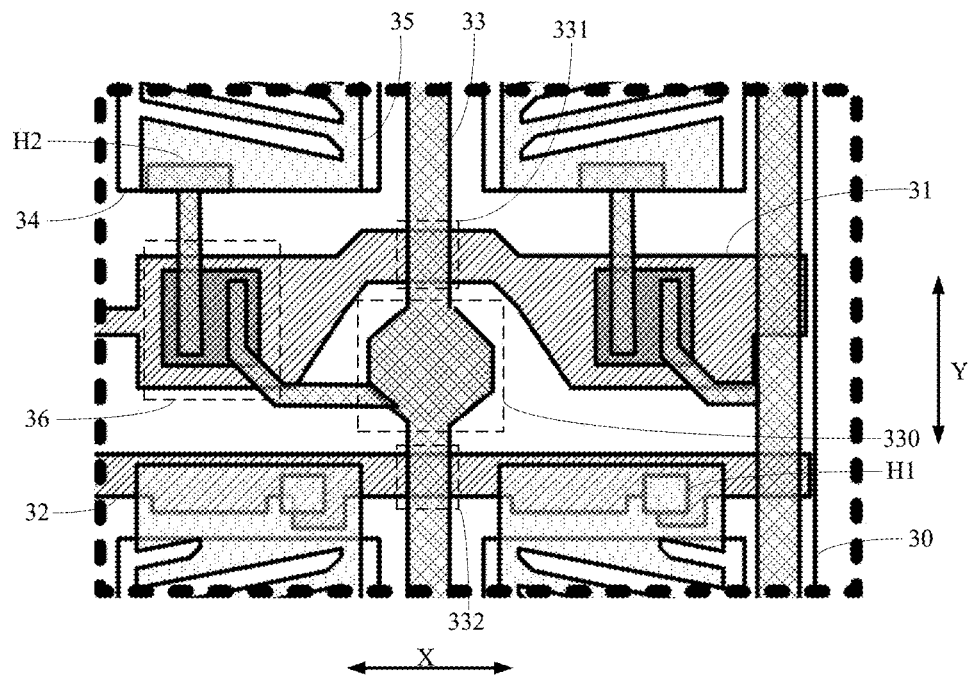
FIG. 8 shows a schematic diagram of an enlarged structure of part B in FIG. 5.

In an embodiment of the present disclosure, as shown in FIG. 8, at least a part of the data lines has an alignment portion 330, and the alignment portion is located in an overlap region of one of the first wiring regions 302 and one of the second wiring regions 303, and an orthographic projection of the alignment portion 330 on the first substrate 30 does not overlap the orthographic projection of each of the common lines 32 and the orthographic projection of each of the scan lines 31 on the first substrate 30. As shown in FIG. 9, an orthographic projection of each of the spacers 6 on the first substrate 30 is located within an orthographic projection of a corresponding one of alignment portions 330 on the first substrate 30, that is, the outer contour of the orthographic projection of each of the spacers 6 on the first substrate 30 is located inside the outer contour of the orthographic projection of the corresponding one of the alignment portions 330 on the first substrate 30, so as to ensure the flatness of portions supported by the spacers 6, thereby ensuring that the spacers 6 can stably support the array substrate.

It should be noted that a scan line 31 around each alignment portion 330 is special-shaped, and the pattern of the scan line 31 is kept symmetrical with respect to a corresponding data line 33 as much as possible to ensure the uniformity of the light efficiency on both sides of the data line 33.

The maximum size of the alignment portion 330 in a data line 33 in the row direction X is larger than the maximum size of other portions of the data line 33 in the row direction X. In the embodiment of the present disclosure, the size in the row direction X of the alignment portion 330 in the data line 33 is designed to be large, to ensure the flatness of the portion supported by a corresponding spacer 6. By designing the size of the other portions of the data line 33 except the alignment portion 330 in the row direction X to be small, the pixel aperture ratio can be increased.

According to some embodiments, as shown in FIGS. 8 and 9, the orthographic projection of the alignment portion 330 on the first substrate 30 is located between orthographic projections of a scan line 31 and a common line 32 that are located in the same first wiring region 302. By using this design, there are metal blocks in four directions: the upper, lower, left, and right of the alignment portion 330 on which the orthographic projection of the spacer 6 is formed. That is, the upper is an overlap portion between a scan line 31 and a data line 33, the lower is an overlap portion between a common line 32 and the data line 33, and each of the left and the right is a transistor 36. That is to say, the thickness of a region in the array substrate 3 corresponding to the spacer 6 is smaller than the thicknesses of regions which are in the upper, lower, left and right of the region and have the above mentioned metal blocks provided therein. In this way, the sliding distance of the spacer 6 can be limited so as to prevent the spacer 6 from sliding to the effective region to ensure the display effect. It should be understood that the effective region refers to a region that can normally emit light, and the effective region is located in a sub-pixel region 301.

As shown in FIG. 8 and FIG. 9, an overlap portion between the orthographic projections of the data line 33 and the scan line 31 on the first substrate 30 can be defined as a first overlap portion 331, and an overlap portion between the orthographic projections of the data line 33 and the common line 31 on the first substrate 30 can be defined as a second overlap portion 332. A distance between the first overlap portion 331 and the alignment portion 330 in the column direction Y is a first distance, a distance between the second overlap portion 332 and the alignment portion 330 in the column direction Y is a second distance, and a ratio of the first distance and the second distance to the first width of each of the first electrode bars 202 is 1.5 to 17 1.5 to 17, for example, 1.5, 3, 5, 8, 11, 14, 17, and so on. For example, each of the first distance and the second distance can be 5 μm to 30 μm, such as, 5 μm, 10 μm, 15 μm, 20 μm, 25 μm, 30 μm, and so on. However, the present disclosure is not limited to this, and the above distances can be specifically determined based on the actual alignment accuracy between the array substrate and the opposed substrate, the region where the first overlap portion 331 is located, and the blocking effect of the region where the second overlap portion 332 is located on the spacer 6, or the influence on the DNU (Dark Not Uniform).

For example, the shape of the orthographic projection of the alignment portion 330 on the first substrate 30 in embodiments of the present disclosure may be a rhombus, an ellipse, a hexagon, and so on, depending on the specific situations. It should be noted that the number and positions of the alignment portions 330 in the array substrate can match the number and positions of the spacers 6, that is, the alignment portions 330 and the spacers 6 are in a one-to-one correspondence.

In an embodiment of the present disclosure, the opposed substrate may include a second substrate (not shown in the figure) on a side of the spacer 6 away from the array substrate 3 and a shielding layer 40 on a side of the second substrate close to the array substrate 3. The shielding layer 40 has cross shielding portions 401, first shielding portions 402 located on opposite sides of a corresponding one of the cross shielding portions 401 in the row direction X, and second shielding portions 403 located on opposite sides of a corresponding one of the cross shielding portions 401 in the column direction Y. It should be noted that orthographic projections of the cross shielding portions 401 on the first substrate 30 at least covers overlap regions of the first wiring regions 302 and the second wiring regions 303, orthographic projections of the first shielding portions 402 on the first substrate 30 at least cover the first wiring regions 302 and are located outside the second wiring regions 303, and orthographic projections of the second shielding portions 403 on the first substrate 30 at least cover the second wiring regions 303 and are located outside the first wiring regions 302.

Figure 11:
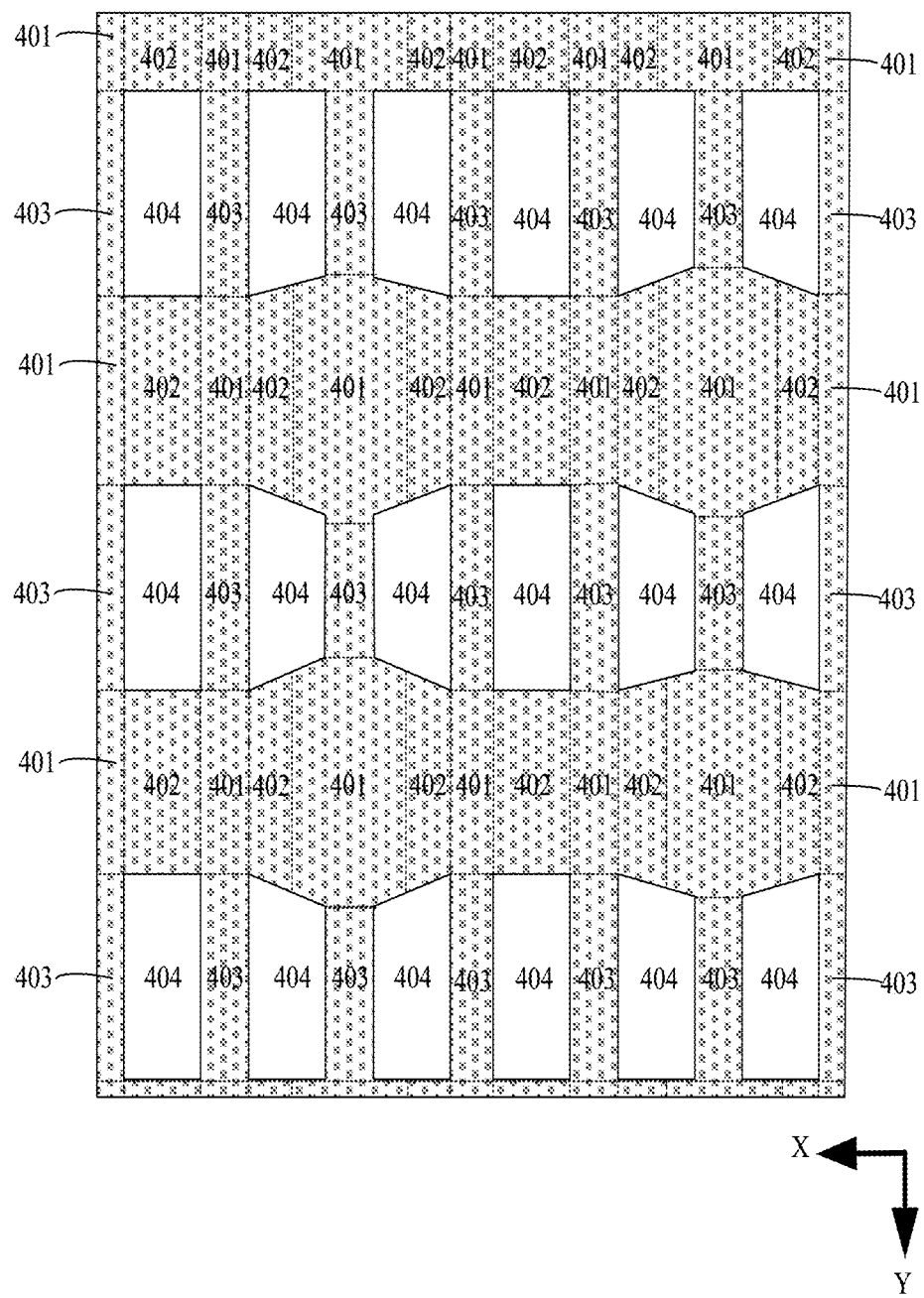
FIG. 11 shows a schematic diagram of a structure of the shielding layer shown in FIG. 10.

Referring to FIG. 10 and FIG. 11, the first shielding portions 402, the second shielding portions 403, and the cross shielding portions 401 in the shielding layer 40 can be arranged in an array. The first shielding portions 402, the second shielding portions 403 and the cross shielding portions 401 arranged in the array can form light-transmitting holes 404. The orthographic projection of each light-transmitting hole 404 on the first substrate 30 is located in a corresponding sub-pixel region 301. The light-transmitting holes 404 are used to allow light to pass through. When the area of the entire display panel is constant, the larger the total area of the light-transmitting holes 404 is, the smaller the total area of the shielding portions will be, and accordingly the higher the light transmittance of the display panel will be, and better display effect can be achieved. It should be understood that none of the dashed lines in FIG. 11 has actual meanings, and the dashed lines are shown only for the convenience of those skilled in the art to understand each part of the shielding layer 22.

It should be noted that in order to ensure that the shielding layer 40 can completely cover the wiring regions on the array substrate 3, the orthographic projections of the first shielding portions 402, the second shielding portions 403, and the cross shielding portions 401 in the shielding layer 40 on the first substrate 30 may also cover a part of each sub-pixel region 301.

In embodiments of the present disclosure, when the display panel is subjected to a large external force, especially when the display panel is subjected to a large impact force during a drop test for example, the spacer 6 mainly appears to slide in the column direction Y. Because the spacer 6 is designed as above the alignment portion 330 of the data line 33, the spacer 6 always slides above the data line 33. Due to the support of the data line 33, the spacer 6 will not scratch the effective region. In addition, because of the shielding of the second shielding portions 403 and the cross shielding portions 401 above the data line 33, even if the film layer (i.e., the alignment film) above the data line 33 is scratched and light leakage occurs, the light can be shielded by the second shielding portions 403 and the cross shielding portions 401. Thus, the defects such as dot-like or large-area dark state light leakage will not occur, thereby improving the display effect.

In addition, even if the spacer 6 appears to slide in the row direction X when subjected to pressure, because of the shielding of the first shielding portions 402 and the cross shielding portions 401 above the first wiring regions 302, the defects such as dot-like or large-area dark state light leakage will not occur, thereby improving the display effect.

In an embodiment of the present disclosure, as shown in FIGS. 10 and 11, the maximum size of each cross shielding portion 401 in the column direction Y may be greater than the maximum size of each first shielding portion 402 in the column direction Y, and the maximum size of each cross shielding portion 401 in the row direction X is greater than the maximum size of each second shielding portion 403 in the row direction X. This design can prevent the spacer 6 from sliding out of the shielding region during the pressure test, thereby avoiding defects such as dot-like or large-area dark state light leakage.

It should be understood that, as shown in FIG. 10 and FIG. 11, the present disclosure is not limited to that the maximum size of all the cross shielding portions 401 in the column direction Y is larger than the maximum size of the first shielding portions 402 in the column direction Y and the maximum size of all the cross shielding portions 401 in the row direction X is greater than the maximum size of the second shielding portions 403 in the row direction X. According to some other embodiments, it is possible that only the cross shielding portions 401 corresponding to the spacers 6 can be designed in this way, and for the cross shielding portions 401 that do not correspond to any spacer, the size of each of the cross shielding portions 401 in the column direction Y may be equal to the size of each first shielding portion 402 in the column direction Y, and the size of each of the cross shielding portions 401 in the row direction X may be the same as the size of each second shielding portion 403 in the row direction X. This can increase the pixel aperture ratio.

For example, as shown in FIG. 11, the cross shielding portions 401 corresponding to the spacers 6 may be approximately hexagonal, and the cross shielding portions 401 not corresponding to the spacers 6, the first shielding portions 402 and the second shielding portions 403 may be approximately rectangular. However, the present disclosure is not limited to this. According to some other embodiments, the cross shielding portions 401, the first shielding portions 402 and the second shielding portions 403 may have other shapes, depending on specific situations.

The orthographic projection of each of the spacers 6 on the second substrate may be located in a central area of an orthographic projection of a corresponding one of the cross shielding portions 401 on the second substrate. A distance between an edge of the orthographic projection of each of the spacers 6 on the second substrate and an edge of the orthographic projection of the corresponding one of the cross shielding portions 401 on the second substrate is a sixth distance. A ratio of the sixth distance to the first width of each of the first electrode bars 202 is 11 to 33, for example, 11, 17, 23, 28, 33, and so on. For example, the sixth distance can be 35 µm to 60 µm, such as, 35 µm, 40 µm, 45 µm, 50 µm, 55 µm, 60 µm, and so on. This design can avoid the spacers 6 to slide out of the shielding region during the pressure test, which can avoid defects such as dark state light leakage.

In embodiments of the present disclosure, the shielding layer 40 can cover a part of the pixel electrode 34 in addition to covering the data line 33, the common line 32, the scan line 31, the transistor 36 and a part of the common electrode 35. There is a coupling electric field at the edge of the pixel electrode 34 close to the scan line 31 and the data line 33, which will cause the liquid crystal arrangement to be disordered during the display procedure, resulting in an ineffective region and thus dark state light leakage at the pixel edge. Therefore, the shielding layer 40 is required to shield such ineffective region.

An orthographic projection of each transistor 36 in a sub-pixel unit on the first substrate 30 is within an orthographic projection of a corresponding one of the first shielding portions 402 on the first substrate 30, the pixel electrode 34 in the sub-pixel unit has a first ineffective region, and the first ineffective region and a corresponding second electrode 363 are connected by a second via structure H2. An orthographic projection of the first ineffective region on the first substrate 30 is located within the orthographic projection of the corresponding one of the first shielding portions 402 on the first substrate 30, and ratio of a size of the first ineffective region in the column direction Y to the first width of each of the first electrode bars 202 is 1.5 to 5.5, for example, 1.5, 2.5, 3.5, 4.5, 5.5, and so on. For example, the size of the first ineffective region in the column direction Y may be 5 µm to 10 µm, such as, 5 µm, 6 µm, 7 µm, 8 µm, 9 µm, 10 µm, and so on. That is, the coverage of each first shielding portion 402 goes beyond the edges of the pixel electrode 34 by at least 5 µm. It should be noted that when a color filter layer is located on the opposed substrate, considering the assembly accuracy of the upper and lower substrates, the first shielding portion 402 should be wider, but the coverage of each first shielding portion 402 goes beyond the edges of the pixel electrode 34 by not greater than 10 µm, to avoid excessively affecting the pixel aperture ratio.

In addition, there is a coupling electric field between the data line 33 and the edge of the pixel electrode 34. That is to say, each pixel electrode 34 further has a second ineffective region, and an orthographic projection of the second ineffective region on the first substrate 30 is located within an orthographic projection of a corresponding one of the second shielding portions 403 on the first substrate 30. The liquid crystal molecules may be negative liquid crystal molecules, the electric field does not cause the liquid crystal molecules to rotate, and a ratio of a size of the second ineffective region in the row direction X to the first width of each of the first electrode bars is 0.3 to 0.5, for example, 0.3, 0.4, 0.5, and so on. For example, the size of the second ineffective region in the row direction X may be 1 µm. That is, the coverage of the second shielding portion 403 goes beyond the edges of the pixel electrode 34 by about 1 μm, so as to shield the shadow region near the data line 33. If the liquid crystal molecules are positive liquid crystal molecules, the coupling electric field between the data line 33 and the pixel electrode 34 does not result in obvious dark state light leakage, but may cause the crosstalk resulted by the liquid crystal molecules more serious. Thus, a ratio of the size of the second ineffective region in the row direction X to the first width of each of the first electrode bars 202 is 2 to 5.5, such as, 2, 2.5, 3, 3.5, 4, 4.5, 5. 5.5 and so on. For example, the size of the second ineffective region in the row direction X may be 6 μm to 10 μm, such as, 6 μm, 7 μm, 8 μm, 9 μm, 10 μm, and so on. That is, the coverage of the second shielding portion 403 goes beyond the edges of the pixel electrode 34 by at least 6 um to shield the region of the coupling electric field.

It should be noted that the color filter layer used in the liquid crystal display panel can be located on the opposed substrate 4 or on the array substrate 3, depending on the specific situations.

An embodiment of the present disclosure further provides a display device, which includes the display panel described in any of the above embodiments. The display device may be a liquid crystal display device.

According to embodiments of the present disclosure, the specific type of the display device is not particularly limited, which may be the types of display devices commonly used in the field, such as liquid crystal display screen, mobile device such as mobile phone, notebook computer, wearable device such as watch, or VR device. Those skilled in the art can select the type of the display device according to the specific purpose of the display device, and detailed descriptions will be omitted here.

It should be noted that in addition to the display panel, the display device may further include other necessary components. Taking a display as an example, the display can further include a backlight module, a housing, a main circuit board, a power line, and so on. Those skilled in the art can know the necessary components according to the specific purpose of the display, and detailed descriptions will be omitted here.

It should be noted that "on", "formed on" and "arranged on" can mean that one layer is directly formed or arranged on another layer, or that a layer is formed or arranged indirectly on another layer, that is, there may be other layers between the two layers.

The terms "a", "an", "the", "said" and "at least one" are used to indicate the presence of one or more elements/components, and so on; the terms "include" and "have" are open terms and means inclusive, and refers to that in addition to the listed elements/components and so on, there may be other elements/components and so on.

It should be noted that although the terms "first", "second", and so on may be used to describe various members, components, elements, regions, layers and/or parts, these members, components, elements, regions, and layers and/or parts should not be limited by these terms. Rather, these terms are used to distinguish one member, component, element, region, layer, and/or part from another.

In the present disclosure, unless otherwise specified, the term "arranged/provided on a same layer" means that two layers, components, members, elements or parts can be formed by the same patterning process, and the two layers, components, members, elements or parts are generally formed of the same material.

In the present disclosure, unless otherwise specified, the expression "patterning process" generally includes steps of photoresist coating, exposure, development, etching, and photoresist stripping, and so on. The expression "one patterning process" means a process of forming patterned layers, components, members, and so on using one mask.

Those skilled in the art will easily think of other embodiments of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are only regarded as exemplary, and the true scope and spirit of the present disclosure are defined by the appended claims.

What is claimed is:

1. An array substrate, wherein the array substrate comprises:
a first substrate having:
  a plurality of sub-pixel regions arranged in an array along a row direction and a column direction;
  first wiring regions each of which is located between two adjacent rows of the sub-pixel regions; and
  second wiring regions each of which is located between two adjacent columns, wherein there is an overlap between the first wiring regions and the second wiring regions;
a plurality of sub-pixel units formed on the first substrate, wherein each of the sub-pixel units comprises a pixel electrode at least partially located in a corresponding one of the sub-pixel regions, a common electrode, and a transistor at least partially located in a corresponding one of the first wiring regions, the transistor comprises a gate electrode, a first electrode, and a second electrode, the pixel electrode is connected to the first electrode, an orthographic projection of the common electrode on the first substrate overlaps an orthographic projection of the pixel electrode on the first substrate, the row direction is the second direction, and the column direction is the first direction;
a plurality of rows of scan lines formed on the first substrate, wherein at least one row of scan line is located in one of the first wiring regions, and the one row of scan line is connected to the gate electrode and is configured to provide a scan signal to a corresponding one of the sub-pixel units,
a plurality of rows of common lines formed on the first substrate, wherein at least one row of common line is located in one of the first wiring regions, and the one row of common line is connected to the common electrode and is configured to provide a common signal to a corresponding one of the sub-pixel units; and
a plurality of columns of data lines formed on the first substrate, wherein at least one column of data line is located in one of the second wiring regions, and the one column data line is connected to the second electrode and is configured to provide a data signal to a corresponding one of the sub-pixel units;
wherein an orthographic projection of each of the scan lines on the first substrate and an orthographic projection of each of the common lines on the first substrate do not overlap, an orthographic projection of each of the data lines on the first substrate overlaps the orthographic projection of each of the scan lines on the first substrate and the orthographic projection of each of the common lines on the first substrate;

wherein at least one of the pixel electrode and the common electrode is of an electrode structure, and the electrode structure comprises:
a first electrode portion comprising a first connection bar extending in a first direction and a plurality of first electrode bars arranged at intervals in the first direction, wherein the first connection bar has a first side and a second side which are opposite in a second direction, the plurality of first electrode bars are located on the first side of the first connection bar and connected to the first connection bar, and ends of adjacent first electrode bars away from the first connection bar are in an open shape;
a second electrode portion spaced apart from the first electrode portion in the first direction, wherein the second electrode portion comprises a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are located on the third side of the second connection bar and connected to the second connection bar, and ends of adjacent second electrode bars away from the second connection bar are in an open shape; and
a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars;
wherein the first direction and the second direction are perpendicular to each other;
wherein no common line is provided in each of the sub-pixel regions;
wherein the common electrode is located on a side of the pixel electrode away from the first substrate, and the common electrode is the electrode structure:
wherein:
the first electrode portion further comprises a signal connection bar which is located on the first side of the first connection bar and connected to the first connection bar and is located on a side of the plurality of first electrode bars away from the conductive connection portion;
the signal connection bar of the common electrode is located in a corresponding one of the first wiring regions;
the common electrode is located on a side of a corresponding one of the common lines away from the first substrate, and the signal connection bar is connected to the corresponding one of the common lines through a first via structure;
the corresponding one of the common lines has a first segment located outside a corresponding one of the second wiring regions and inside the corresponding one of the first wiring regions, the first segment has a first portion, a second portion and a third portion that are sequentially arranged in the row direction, a side of the third portion away from a corresponding scan line is farther away from the scan line than a side of the first portion away from the scan line, and a side of the second portion away from the scan line is closer to the scan line than the side of the first portion away from the scan line, and a notch is formed between the side of the second portion away from the scan line and the first portion and the third portion;
a part of an orthographic projection of the first via structure on the first substrate overlaps an orthographic projection of the second portion and an orthographic projection of the third portion on the first substrate, and another part of the orthographic projection of the first via structure on the first substrate overlaps an orthographic projection of the notch on the first substrate;
a distance between a boundary line of the first via structure and a boundary line of the third portion in the column direction is a third distance;
a distance between a boundary line of the first via structure and a boundary line of the third portion away from the second portion in the row direction is a fourth distance;
a distance between a boundary line of the first via structure and a boundary line of the second portion away from the third portion in the row direction is a fifth distance; and
a ratio of each of the third distance, the fourth distance, and the fifth distance to the first width of each of the first electrode bars is 1 to 6.

2. The array substrate according to claim 1, wherein the first electrode bars and the second electrode bars extend linearly along a third direction and are not bent along the third direction, and the third direction intersects both the first direction and the second direction.

3. The array substrate according to claim 1, wherein at least a part of the data lines has an alignment portion, and the alignment portion is located in an overlap region of one of the first wiring regions and one of the second wiring regions, and an orthographic projection of the alignment portion on the first substrate does not overlap the orthographic projection of each of the common lines and the orthographic projection of each of the scan lines on the first substrate;
wherein the array substrate further comprises:
a plurality of spacers each located on a side of a corresponding one of the data lines away from the first substrate, wherein an orthographic projection of each of the spacers on the first substrate is located within an orthographic projection of a corresponding one of alignment portions on the first substrate.

4. The array substrate according to claim 3, wherein each of the first wiring regions is provided with one row of the scan lines and one row of the common lines, and an orthographic projection of one of the alignment portions on the first substrate is between an orthographic projection of the one row of the scan lines and an orthographic projection of the one row of the common lines on the first substrate.

5. The array substrate according to claim 4, wherein each of the at least a part of the data lines further has a first overlap portion and a second overlap portion, an orthographic projection of the first overlap portion on the first substrate overlaps the orthographic projection of the one row of the scan lines on the first substrate, an orthographic projection of the second overlap portion on the first substrate overlaps the orthographic projection of the one row of the common lines on the first substrate;
wherein a distance between the first overlap portion and the alignment portion in the column direction is a first distance, a distance between the second overlap portion and the alignment portion in the column direction is a second distance, and a ratio of the first distance and the second distance to the first width of each of the first electrode bars is 1.5 to 17.

6. An array substrate, wherein the array substrate comprises:

a first substrate having:

a plurality of sub-pixel regions arranged in an array along a row direction and a column direction;

first wiring regions each of which is located between two adjacent rows of the sub-pixel regions; and second wiring regions each of which is located between two adjacent columns, wherein there is an overlap between the first wiring regions and the second wiring regions;

a plurality of sub-pixel units formed on the first substrate, wherein each of the sub-pixel units comprises a pixel electrode at least partially located in a corresponding one of the sub-pixel regions, a common electrode, and a transistor at least partially located in a corresponding one of the first wiring regions, the transistor comprises a gate electrode, a first electrode, and a second electrode, the pixel electrode is connected to the first electrode, an orthographic projection of the common electrode on the first substrate overlaps an orthographic projection of the pixel electrode on the first substrate, the row direction is the second direction, and the column direction is the first direction;

a plurality of rows of scan lines formed on the first substrate, wherein at least one row of scan line is located in one of the first wiring regions, and the one row of scan line is connected to the gate electrode and is configured to provide a scan signal to a corresponding one of the sub-pixel units, a plurality of rows of common lines formed on the first substrate, wherein at least one row of common line is located in one of the first wiring regions, and the one row of common line is connected to the common electrode and is configured to provide a common signal to a corresponding one of the sub-pixel units; and a plurality of columns of data lines formed on the first substrate, wherein at least one column of data line is located in one of the second wiring regions, and the one column data line is connected to the second electrode and is configured to provide a data signal to a corresponding one of the sub-pixel units;

wherein an orthographic projection of each of the scan lines on the first substrate and an orthographic projection of each of the common lines on the first substrate do not overlap, an orthographic projection of each of the data lines on the first substrate overlaps the orthographic projection of each of the scan lines on the first substrate and the orthographic projection of each of the common lines on the first substrate;

wherein at least one of the pixel electrode and the common electrode is of an electrode structure, and the electrode structure comprises:

a first electrode portion comprising a first connection bar extending in a first direction and a plurality of first electrode bars arranged at intervals in the first direction, wherein the first connection bar has a first side and a second side which are opposite in a second direction, the plurality of first electrode bars are located on the first side of the first connection bar and connected to the first connection bar, and ends of adjacent first electrode bars away from the first connection bar are in an open shape;

a second electrode portion spaced apart from the first electrode portion in the first direction, wherein the second electrode portion comprises a second connection bar extending in the first direction and a plurality of second electrode bars arranged at intervals in the first direction, the second connection bar is located at a position on the first side away from the second side, the second connection bar has a third side and a fourth side which are opposite in the second direction, the third side is located at a position on the fourth side close to the first side, the plurality of second electrode bars are located on the third side of the second connection bar and connected to the second connection bar, and ends of adjacent second electrode bars away from the second connection bar are in an open shape; and a conductive connection portion arranged between the first electrode portion and the second electrode portion, wherein both ends of the conductive connection portion are connected to the first connection bar and the second connection bar, respectively, and an area of the conductive connection portion is larger than an area of each of the first electrode bars and an area of each of the second electrode bars;

wherein the first direction and the second direction are perpendicular to each other;

wherein for two sub-pixel regions which are adjacent in the column direction, patterns of pixel electrodes in the two sub-pixel regions are mirror symmetrical with each other with respect to a first wiring region between the two sub-pixel regions;

wherein the common electrode is located on a side of the pixel electrode away from the first substrate, and the common electrode is the electrode structure;

wherein:

the first electrode portion further comprises a signal connection bar which is located on the first side of the first connection bar and connected to the first connection bar and is located on a side of the plurality of first electrode bars away from the conductive connection portion;

the signal connection bar of the common electrode is located in a corresponding one of the first wiring regions;

the common electrode is located on a side of a corresponding one of the common lines away from the first substrate, and the signal connection bar is connected to the corresponding one of the common lines through a first via structure;

the corresponding one of the common lines has a first segment located outside a corresponding one of the second wiring regions and inside the corresponding one of the first wiring regions, the first segment has a first portion, a second portion and a third portion that are sequentially arranged in the row direction, a side of the third portion away from a corresponding scan line is farther away from the scan line than a side of the first portion away from the scan line, and a side of the second portion away from the scan line is closer to the scan line than the side of the first portion away from the scan line, and a notch is formed between the side of the second portion away from the scan line and the first portion and the third portion;

a part of an orthographic projection of the first via structure on the first substrate overlaps an orthographic projection of the second portion and an orthographic projection of the third portion on the first substrate, and another part of the orthographic projection of the first via structure on the first substrate overlaps an orthographic projection of the notch on the first substrate:
a distance between a boundary line of the first via structure and a boundary line of the third portion in the column direction is a third distance;
a distance between a boundary line of the first via structure and a boundary line of the third portion away from the second portion in the row direction is a fourth distance:
a distance between a boundary line of the first via structure and a boundary line of the second portion away from the third portion in the row direction is a fifth distance; and
a ratio of each of the third distance, the fourth distance, and the fifth distance to the first width of each of the first electrode bars is 1 to 6.

7. The array substrate according to claim 6, wherein the first electrode bars and the second electrode bars extend linearly along a third direction and are not bent along the third direction, and the third direction intersects both the first direction and the second direction.

8. The array substrate according to claim 6, wherein at least a part of the data lines has an alignment portion, and the alignment portion is located in an overlap region of one of the first wiring regions and one of the second wiring regions, and an orthographic projection of the alignment portion on the first substrate does not overlap the orthographic projection of each of the common lines and the orthographic projection of each of the scan lines on the first substrate;
wherein the array substrate further comprises:
a plurality of spacers each located on a side of a corresponding one of the data lines away from the first substrate, wherein an orthographic projection of each of the spacers on the first substrate is located within an orthographic projection of a corresponding one of alignment portions on the first substrate.

9. The array substrate according to claim 8, wherein each of the first wiring regions is provided with one row of the scan lines and one row of the common lines, and an orthographic projection of one of the alignment portions on the first substrate is between an orthographic projection of the one row of the scan lines and an orthographic projection of the one row of the common lines on the first substrate.

10. The array substrate according to claim 9, wherein each of the at least a part of the data lines further has a first overlap portion and a second overlap portion, an orthographic projection of the first overlap portion on the first substrate overlaps the orthographic projection of the one row of the scan lines on the first substrate, an orthographic projection of the second overlap portion on the first substrate overlaps the orthographic projection of the one row of the common lines on the first substrate;
wherein a distance between the first overlap portion and the alignment portion in the column direction is a first distance, a distance between the second overlap portion and the alignment portion in the column direction is a second distance, and a ratio of the first distance and the second distance to the first width of each of the first electrode bars is 1.5 to 17.

11. The array substrate according to claim 7, wherein the conductive connection portion comprises:
a first conductive connection bar and a second conductive connection bar that are arranged at intervals in the second direction and both extend in the first direction; and
at least two third conductive connection bars located between the first conductive connection bar and the second conductive connection bar and arranged at intervals in the first direction, wherein two ends of each of the third conductive connection bars are connected to the first conductive connection bar and the second conductive connection bar, respectively, and extending directions of the third conductive connection bars are parallel to the third direction;
wherein the first conductive connection bar is connected to the first connection bar, and the second conductive connection bar is connected to the second connection bar.

12. The array substrate according to claim 11, wherein:
a first width of each of the third conductive connection bars is equal to the first width of each of the first electrode bars;
a second width of the first conductive connection bar is equal to a second width of the first connection bar;
a second width of the second conductive connection bar is equal to a second width of the second connection bar;
the second width is a size in the second direction.

13. The array substrate according to claim 12, wherein:
a slit between adjacent first electrode bars is a first slit;
a slit between adjacent second electrode bars is a second slit;
a slit between adjacent third conductive connection bars is a third slit;
a slit between the third conductive connection bars and the first electrode bars is a fourth slit;
a slit between the third conductive connection bars and the second electrode bars is a fifth slit; and
a first width of the first slit, a first width of the second slit, a first width of the third slit, a first width of the fourth slit and a first width of the fifth slit are all equal.

14. The array substrate according to claim 12, wherein a ratio of the first width of the first slit to the first width of each of the first electrode bars is 1 to 4.

15. The array substrate according to claim 13, wherein a length of the first conductive connection bar and a length of the second conductive connection bar are both smaller than a length of the first connection bar and smaller than a length of the second connection bar, and the length is a size in the first direction.

16. The array substrate according to claim 7, wherein the conductive connection portion is a conductive connection bar, the conductive connection bar extends in the third direction, and a ratio of a first width of the conductive connection bar to the first width of each of the first electrode bars is 1.5 to 5.5.

* * * * *